US012676960B2

(12) United States Patent
Sim et al.

(10) Patent No.: US 12,676,960 B2
(45) Date of Patent: Jul. 7, 2026

(54) METHOD AND APPARATUS FOR VIDEO CODING USING IMPLICIT ARBITRARY BLOCK PARTITION AND PREDICTION ACCORDING THERETO

(71) Applicants: Hyundai Motor Company, Seoul (KR); Kia Corporation, Seoul (KR); Kwangwoon University Industry-Academic Collaboration Foundation, Seoul (KR)

(72) Inventors: Dong Gyu Sim, Seoul (KR); Min Hun Lee, Uijeongbu (KR); Myung Oh Hong, Gwangmyeong (KR); Jin Heo, Yongin (KR); Seung Wook Park, Yongi (KR)

(73) Assignees: Hyundai Motor Company, Seoul (KR); Kia Corporation, Seoul (KR); Kwangwoon University Industry-Academic Collaboration Foundation, Seoul (KR)

( * ) Notice: Subject to any disclaimer, the term of this patent is extended or adjusted under 35 U.S.C. 154(b) by 33 days.

(21) Appl. No.: 18/659,945

(22) Filed: May 9, 2024

(65) Prior Publication Data

US 2024/0297983 A1 Sep. 5, 2024

Related U.S. Application Data

(63) Continuation of application No. PCT/KR2022/014665, filed on Sep. 29, 2022.

(30) Foreign Application Priority Data

Nov. 10, 2021 (KR) ........................ 10-2021-0154042
Sep. 28, 2022 (KR) ........................ 10-2022-0123078

(51) Int. Cl.
*H04N 19/119* (2014.01)
*H04N 19/105* (2014.01)
(Continued)

(52) U.S. Cl.
CPC ......... *H04N 19/105* (2014.11); *H04N 19/119* (2014.11); *H04N 19/159* (2014.11);
(Continued)

(58) Field of Classification Search
CPC .. H04N 19/119; H04N 19/105; H04N 19/159; H04N 19/11; H04N 19/593; H04N 19/70; H04N 19/176
See application file for complete search history.

(56) References Cited

U.S. PATENT DOCUMENTS 11,252,435 B2 * 2/2022 Divorra Escoda ... H04N 19/156
11,323,702 B2 * 5/2022 Jaeger .................. H04N 19/119
(Continued)

FOREIGN PATENT DOCUMENTS

KR 10-1541077 B1 7/2015
KR 10-2018-0107762 A 10/2018
(Continued)

OTHER PUBLICATIONS

Exploration on enhanced compression beyond VVC capability; Seregin—2021; (Year: 2021).*
GPM with inter and intra prediction; Kidani—2021; (Year: 2021).*

*Primary Examiner* — Luis Perez-Fuentes
(74) *Attorney, Agent, or Firm* — Fox Rothschild LLP

(57) ABSTRACT

A method and apparatus for video coding use implicit arbitrary block partitioning and prediction according to the implicit arbitrary block partitioning. The video coding method and the apparatus implicitly determine partitioned regions of a current block based on information on previously reconstructed neighboring reference regions. The
(Continued)

video coding method and the apparatus generate predicted signals of the partitioned regions to improve video coding efficiency and to enhance video quality.

16 Claims, 42 Drawing Sheets

(51) Int. Cl.

| | |
|---|---|
| ***H04N 19/11*** | (2014.01) |
| ***H04N 19/159*** | (2014.01) |
| ***H04N 19/176*** | (2014.01) |
| ***H04N 19/593*** | (2014.01) |
| ***H04N 19/82*** | (2014.01) |
| ***H04N 19/86*** | (2014.01) |

(52) U.S. Cl.

CPC ........... *H04N 19/176* (2014.11); *H04N 19/82* (2014.11); *H04N 19/86* (2014.11)

(56) References Cited

U.S. PATENT DOCUMENTS

| | | | | |
|---|---|---|---|---|
| 11,418,808 | B2 * | 8/2022 | Ahn | H04N 19/577 |
| 11,695,967 | B2 * | 7/2023 | Furht | H04N 19/119<br>375/240.12 |
| 12,155,828 | B2 * | 11/2024 | Yang | H04N 19/119 |
| 2022/0272373 | A1 | 8/2022 | Moon et al. | |
| 2023/0319271 | A1 * | 10/2023 | Lim | H04N 19/96<br>375/240.02 |
| 2024/0031560 | A1 * | 1/2024 | Chen | H04N 19/11 |
| 2024/0179326 | A1 * | 5/2024 | Sim | H04N 19/96 |
| 2024/0297983 | A1 * | 9/2024 | Sim | H04N 19/82 |

FOREIGN PATENT DOCUMENTS

| | | | |
|---|---|---|---|
| KR | 10-2018-0131570 | A | 12/2018 |
| KR | 10-2063285 | B1 | 1/2020 |
| KR | 10-2020-0026394 | A | 3/2020 |

* cited by examiner

| | |
|---|---|
| ⬜ (hatched) | Pre-Reconstructed Region |
| ⬜ | Template |
| ⬜ (hatched) | Current Block |
| ⬜ (dotted) | Template-Analogous Region |
| ⬜ (honeycomb) | Reference Region Of Current Block |

$$| m(1) - m(2) | > T_m$$
$$| m(6) - m(7) | > T_m$$
$$| m(8) - m(9) | > T_m$$

▨ Current Block          ◫ Reference Region $$| m(2) - m(3) | > T_m$$
$$| m(7) - m(8) | > T_m$$
$$| m(8) - m(9) | > T_m$$

(If number of pixels in $r_3 < t$)

$$| m(8) - m(9) | > | m(7) - m(8) |$$

▨ Current Block          ◫ Reference Region $$dp0 = Abs(p_{2,0} - 2 \times p_{1,0} + p_{0,0})$$
$$dp3 = Abs(p_{2,3} - 2 \times p_{1,3} + p_{0,3})$$
$$dp0 = Abs(q_{2,0} - 2 \times q_{1,0} + q_{0,0})$$
$$dp3 = Abs(q_{2,3} - 2 \times q_{1,3} + q_{0,3})$$
$$dpq0 = dp0 + dq0$$
$$dpq3 = dp3 + dq3$$

If dpq0+dpq3 > β

☒ Current Block    ☐ Reference Region

| | |
|---|---|
| ▦ | Current Block |
| ◩ | Pre-Reconstructed Reference Samples Used For Predicting Region $r_1$ |
| ◪ | Pre-Reconstructed Reference Samples Used For Predicting Region $r_2$ |

Current Block

Pre-Reconstructed Neighboring Reference Subblocks For Constructing MPM List Used For Determining Prediction Mode Of Region $r_1$ Pre-Reconstructed Neighboring Reference Subblocks For Constructing MPM List Used For Determining Prediction Mode Of Region $r_2$ Current Block

| 8 | 8 | 8 | 4 | 4 | 4 | 4 | 4 | 0 | 0 | 0 |
|---|---|---|---|---|---|---|---|---|---|---|
| 8 | 8 | 8 | 4 | 4 | 4 | 4 | 4 | 0 | 0 | 0 |
| 8 | 8 | 8 | 4 | 4 | 4 | 4 | 4 | 0 | 0 | 0 |
| 8 | 8 | 8 | 4 | 4 | 4 | 4 | 4 | 0 | 0 | 0 |
| 8 | 8 | 8 | 4 | 4 | 4 | 4 | 4 | 0 | 0 | 0 |
| 8 | 8 | 8 | 4 | 4 | 4 | 4 | 4 | 0 | 0 | 0 |
| 8 | 8 | 8 | 4 | 4 | 4 | 4 | 4 | 0 | 0 | 0 |
| 8 | 8 | 8 | 4 | 4 | 4 | 4 | 4 | 0 | 0 | 0 |

Weights ($w_{i,j}$)

Current Block

Example Locations Of Luminance Values For Deriving Weights

M

N

| | | | | | | | | | | | | |
|---|---|---|---|---|---|---|---|---|---|---|---|---|
| 8 | 8 | 8 | 8 | 4 | 3 | 2 | 1 | 0 | 0 | 0 | 0 | 0 |
| 8 | 8 | 8 | 8 | 4 | 3 | 2 | 1 | 0 | 0 | 0 | 0 | 0 |
| 8 | 8 | 8 | 8 | 5 | 4 | 3 | 2 | 0 | 0 | 0 | 0 | 0 |
| 8 | 8 | 8 | 8 | 5 | 4 | 3 | 2 | 0 | 0 | 0 | 0 | 0 |
| 8 | 8 | 8 | 8 | 6 | 5 | 4 | 3 | 0 | 0 | 0 | 0 | 0 |
| 8 | 8 | 8 | 8 | 6 | 5 | 4 | 3 | 0 | 0 | 0 | 0 | 0 |
| 8 | 8 | 8 | 8 | 7 | 6 | 5 | 4 | 0 | 0 | 0 | 0 | 0 |
| 8 | 8 | 8 | 8 | 7 | 6 | 5 | 4 | 0 | 0 | 0 | 0 | 0 |

If $H\_r_1 + H\_r_2 < T_{BL}$

| | | | | | | | | | | | | |
|---|---|---|---|---|---|---|---|---|---|---|---|---|
| 8 | 8 | 8 | 8 | 4 | 2 | 0 | 0 | 0 | 0 | 0 | 0 | 0 |
| 8 | 8 | 8 | 8 | 4 | 2 | 0 | 0 | 0 | 0 | 0 | 0 | 0 |
| 8 | 8 | 8 | 8 | 6 | 4 | 2 | 0 | 0 | 0 | 0 | 0 | 0 |
| 8 | 8 | 8 | 8 | 6 | 4 | 2 | 0 | 0 | 0 | 0 | 0 | 0 |
| 8 | 8 | 8 | 8 | 8 | 6 | 4 | 2 | 0 | 0 | 0 | 0 | 0 |
| 8 | 8 | 8 | 8 | 8 | 6 | 4 | 2 | 0 | 0 | 0 | 0 | 0 |
| 8 | 8 | 8 | 8 | 8 | 8 | 6 | 4 | 0 | 0 | 0 | 0 | 0 |
| 8 | 8 | 8 | 8 | 8 | 8 | 6 | 4 | 0 | 0 | 0 | 0 | 0 |

If $T_{BL} \leq H\_r_1 + H\_r_2 < T_{BH}$

| | | | | | | | | | | | | |
|---|---|---|---|---|---|---|---|---|---|---|---|---|
| 8 | 8 | 8 | 8 | 0 | 0 | 0 | 0 | 0 | 0 | 0 | 0 | 0 |
| 8 | 8 | 8 | 8 | 8 | 0 | 0 | 0 | 0 | 0 | 0 | 0 | 0 |
| 8 | 8 | 8 | 8 | 8 | 0 | 0 | 0 | 0 | 0 | 0 | 0 | 0 |
| 8 | 8 | 8 | 8 | 8 | 8 | 0 | 0 | 0 | 0 | 0 | 0 | 0 |
| 8 | 8 | 8 | 8 | 8 | 8 | 0 | 0 | 0 | 0 | 0 | 0 | 0 |
| 8 | 8 | 8 | 8 | 8 | 8 | 8 | 0 | 0 | 0 | 0 | 0 | 0 |
| 8 | 8 | 8 | 8 | 8 | 8 | 8 | 0 | 0 | 0 | 0 | 0 | 0 |
| 8 | 8 | 8 | 8 | 8 | 8 | 8 | 8 | 0 | 0 | 0 | 0 | 0 |

If $T_{BH} \leq H\_r_1 + H\_r_2$

Example Construction Of Weights ($w_{i,j}$)

FIG. 26

If $H\_r_1\ (1,4) + H\_r_2\ (1,4) < T_{BL}$ and $T_{BL} \leq H\_r_1(5,N) + H\_r_2(5,N) < T_{BH}$ Example Construction Of Weights ($w_{i,j}$)

$r_1$ Sub-Region Predicted Signals $r_2$ Sub-Region Predicted Signals

METHOD AND APPARATUS FOR VIDEO CODING USING IMPLICIT ARBITRARY BLOCK PARTITION AND PREDICTION ACCORDING THERETO

CROSS-REFERENCE TO RELATED APPLICATIONS

This application is a continuation of International Application No. PCT/KR2022/014665 filed on Sep. 29, 2022, which claims under 35 U.S.C. § 119(a) the benefit of Korean Patent Application No. 10-2021-0154042, filed on Nov. 10, 2021, and Korean Patent Application No. 10-2022-0123078, filed on Sep. 28, 2022, the entire contents of which are incorporated herein by reference.

BACKGROUND

(a) Technical Field

The present disclosure relates to a video coding method and an apparatus using implicit arbitrary block partitioning and prediction according thereto.

(b) Description of the Related Art

Since video data has a large amount of data compared to audio or still image data, the video data requires a lot of hardware resources, including a memory, to store or transmit the video data without processing for compression.

Accordingly, an encoder is generally used to compress and store or transmit video data. A decoder receives the compressed video data, decompresses the received compressed video data, and plays the decompressed video data. Video compression techniques include H.264/AVC, High Efficiency Video Coding (HEVC), and Versatile Video Coding (VVC), which has improved coding efficiency by about 30% or more compared to HEVC.

However, since the image size, resolution, and frame rate gradually increase, the amount of data to be encoded also increases. Accordingly, a new compression technique providing higher coding efficiency and an improved image enhancement effect than existing compression techniques is required.

Meanwhile, VVC utilizes Geometric Partitioning Mode (GPM), taking advantage of a more flexible partitioning than the square/rectangular partitioning based on traditional quadtree, binary tree, and ternary tree. GPM utilizes, among predefined modes, a partitioning mode index that partitions the current block into two regions and utilizes motion vector information for each of the two regions to perform inter prediction.

The video encoding apparatus determines the split mode index that partitions the current block into two regions and the motion vector information for each region and encodes and transmits the split mode index and the motion vector information to the video decoding apparatus. The video decoding apparatus partitions the current block into two non-rectangular regions according to the parsed partitioning mode of GPM, then generates prediction blocks for the respective regions, and generates the final prediction block of the current block by weighted summing the two prediction blocks. At this time, the weights used in the weighted summing process may be determined according to the partitioning mode of GPM. As described above, the conventional GPM technique partitions the current block into two regions and then performs inter prediction. Therefore, to improve coding efficiency and enhance video quality, the arbitrary partitioning of the current block and the resulting prediction need to be further improved.

SUMMARY

The present disclosure provides a video coding method and an apparatus for implicitly determining partitioned regions of a current block based on information on previously reconstructed neighboring reference regions. The video coding method and the apparatus generate predicted signals of the partitioned regions to improve video coding efficiency and to enhance video quality.

At least one aspect of the present disclosure provides a method performed by a video decoding apparatus for intra-predicting a current block. The method includes selecting a reference region of the current block. Here, the reference region is a previously reconstructed region that is present in at least one of a top or a left of the current block. The method also includes deriving arbitrary partitioning information of the current block implicitly by using information on the reference region. The method also includes partitioning the current block into sub-regions according to the arbitrary partitioning information. The method also includes determining a prediction mode for each sub-region of the sub-regions and generating predicted signals of each sub-region by using the prediction mode. The method also includes generating and using weights to perform weighted summing on the predicted signals of the sub-regions to generate final predicted signals of the current block.

Another aspect of the present disclosure provides a method performed by a video encoding apparatus for intra-predicting a current block. The method includes selecting a reference region of the current block. Here, the reference region is a previously reconstructed region that is present in at least one of a top or a left of the current block. The method also includes deriving arbitrary partitioning information of the current block implicitly by using information on the reference region. The method also includes partitioning the current block into sub-regions according to the arbitrary partitioning information. The method also includes determining a prediction mode for each sub-region of the sub-regions and generating predicted signals of each sub-region by using the prediction mode. The method also includes generating and using weights to perform weighted summing on the predicted signals of the sub-regions to generate final predicted signals of the current block.

Yet another aspect of the present disclosure provides a computer-readable recording medium storing a bitstream generated by a video encoding method. The video encoding method includes selecting a reference region of a current block. Here, the reference region is a previously reconstructed region that is present in at least one of a top or a left of the current block. The video encoding method also includes deriving arbitrary partitioning information of the current block implicitly by using information on the reference region; partitioning the current block into sub-regions according to the arbitrary partitioning information. The video encoding method also includes determining a prediction mode for each sub-region of the sub-regions and generating predicted signals of each sub-region by using the prediction mode. The video encoding method also includes generating and using weights to perform weighted summing on the predicted signals of the sub-regions to generate final predicted signals of the current block.

As described above, the present disclosure provides a video coding methods and an apparatus that implicitly determine the partitioned regions of the current block based on information on previously reconstructed neighboring reference regions and generate predicted signals of the partitioned regions. Thus, the video coding method and the apparatus improve the video encoding efficiency and enhance video quality.

BRIEF DESCRIPTION OF THE DRAWINGS

FIGS. 26 and 27 are diagrams illustrating weighted sums of predicted signals in sub-regions, according to yet other embodiments of the present disclosure.

DETAILED DESCRIPTION

Figure 1:
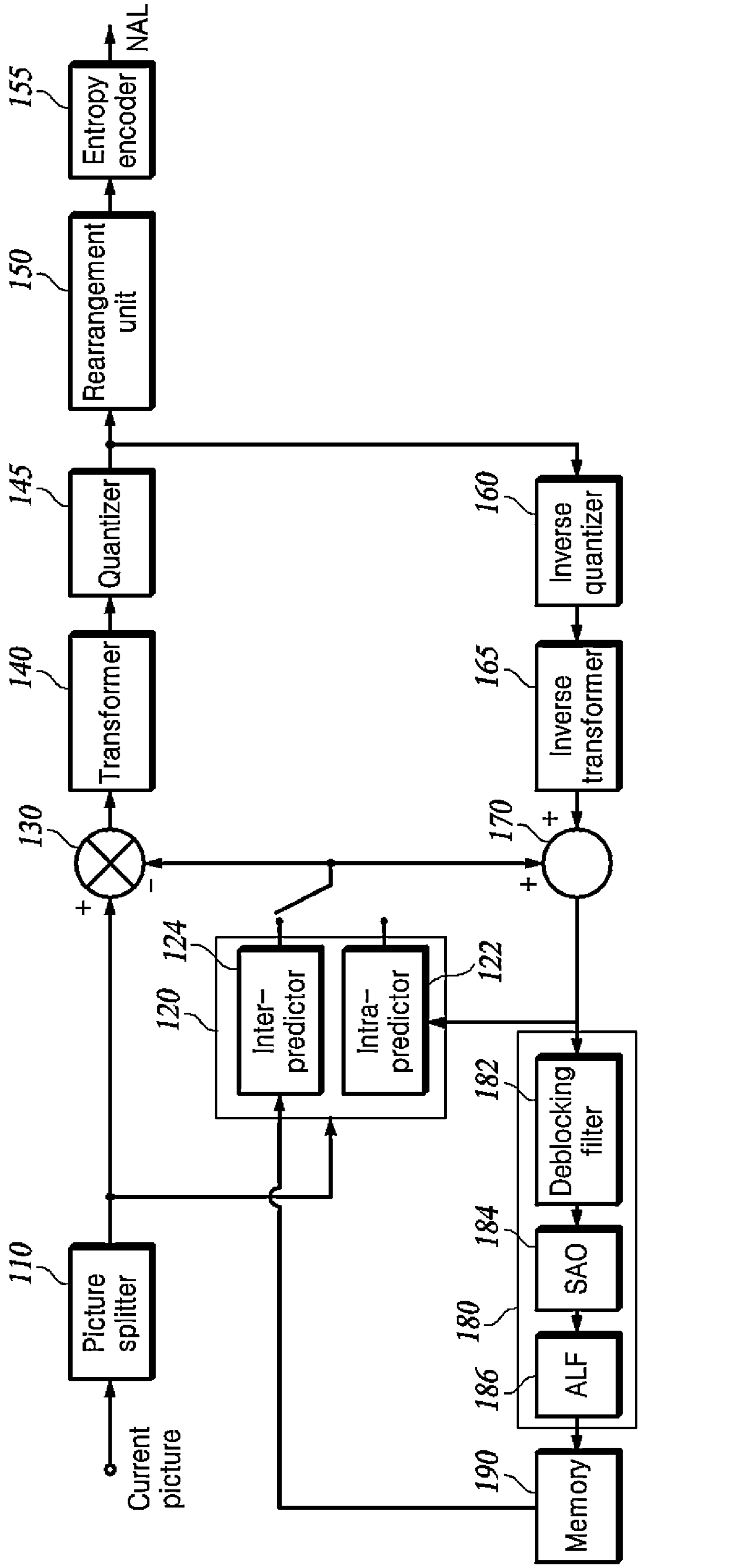
FIG. 1 is a block diagram of a video encoding apparatus that may implement the techniques of the present disclosure.

The terminology used herein is for the purpose of describing particular embodiments only and is not intended to be limiting of the present disclosure. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Hereinafter, some embodiments of the present disclosure are described in detail with reference to the accompanying illustrative drawings. In the following description, like reference numerals designate like elements, although the elements are shown in different drawings. Further, in the following description of some embodiments, detailed descriptions of related known components and functions when considered to obscure the subject of the present disclosure may be omitted for the purpose of clarity and for brevity.

FIG. 1 is a block diagram of a video encoding apparatus that may implement technologies of the present disclosure. Hereinafter, referring to illustration of FIG. 1, the video encoding apparatus and components of the apparatus are described.

The encoding apparatus may include a picture splitter 110, a predictor 120, a subtractor 130, a transformer 140, a quantizer 145, a rearrangement unit 150, an entropy encoder 155, an inverse quantizer 160, an inverse transformer 165, an adder 170, a loop filter unit 180, and a memory 190.

Each component of the encoding apparatus may be implemented as hardware or software or implemented as a combination of hardware and software. Further, a function of each component may be implemented as software, and a microprocessor may also be implemented to execute the function of the software corresponding to each component.

One video is constituted by one or more sequences including a plurality of pictures. Each picture is split into a plurality of areas, and encoding is performed for each area. For example, one picture is split into one or more tiles or/and slices. Here, one or more tiles may be defined as a tile group. Each tile or/and slice is split into one or more coding tree units (CTUs). In addition, each CTU is split into one or more coding units (CUs) by a tree structure. Information applied to each coding unit (CU) is encoded as a syntax of the CU, and information commonly applied to the CUS included in one CTU is encoded as the syntax of the CTU. Further, information commonly applied to all blocks in one slice is encoded as the syntax of a slice header, and information applied to all blocks constituting one or more pictures is encoded to a picture parameter set (PPS) or a picture header. Furthermore, information, which the plurality of pictures commonly refers to, is encoded to a sequence parameter set (SPS). In addition, information, which one or more SPS commonly refer to, is encoded to a video parameter set (VPS). Further, information commonly applied to one tile or tile group may also be encoded as the syntax of a tile or tile group header. The syntaxes included in the SPS, the PPS, the slice header, the tile, or the tile group header may be referred to as a high level syntax.

The picture splitter 110 determines a size of a coding tree unit (CTU). Information on the size of the CTU (CTU size) is encoded as the syntax of the SPS or the PPS and delivered to a video decoding apparatus.

The picture splitter 110 splits each picture constituting the video into a plurality of coding tree units (CTUs) having a predetermined size and then recursively splits the CTU by using a tree structure. A leaf node in the tree structure becomes the coding unit (CU), which is a basic unit of encoding.

The tree structure may be a quadtree (QT) in which a higher node (or a parent node) is split into four lower nodes (or child nodes) having the same size. The tree structure may also be a binary tree (BT) in which the higher node is split into two lower nodes. The tree structure may also be a ternary tree (TT) in which the higher node is split into three lower nodes at a ratio of 1:2:1. The tree structure may also be a structure in which two or more structures among the QT structure, the BT structure, and the TT structure are mixed. For example, a quadtree plus binary tree (QTBT) structure may be used or a quadtree plus binary tree ternary tree (QTBTTT) structure may be used. Here, a binary tree ternary tree (BTTT) is added to the tree structures to be referred to as a multiple-type tree (MTT).

Figure 2:
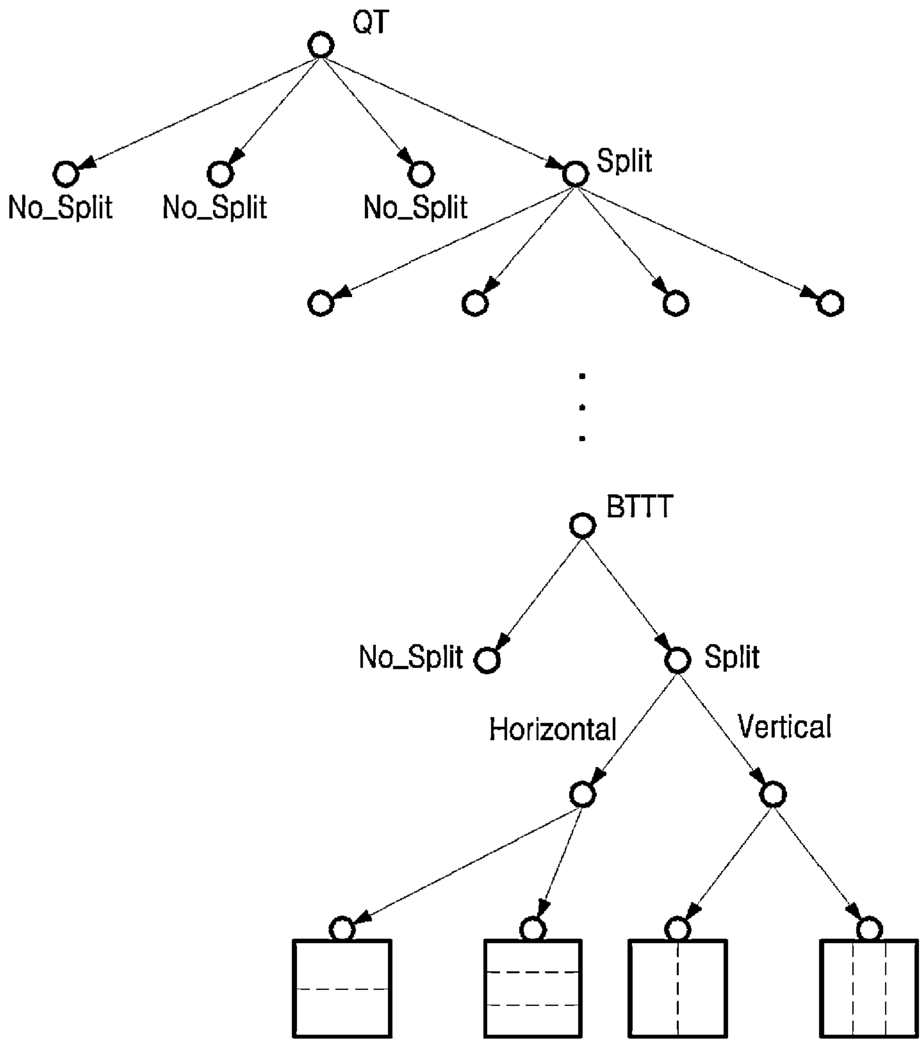
FIG. 2 illustrates a method for partitioning a block using a quadtree plus binary tree ternary tree (QTBTTT) structure.

FIG. 2 is a diagram for describing a method for splitting a block by using a QTBTTT structure.

As illustrated in FIG. 2, the CTU may first be split into the QT structure. Quadtree splitting may be recursive until the size of a splitting block reaches a minimum block size (MinQTSize) of the leaf node permitted in the QT. A first flag (QT_split_flag) indicating whether each node of the QT structure is split into four nodes of a lower layer is encoded by the entropy encoder 155 and signaled to the video decoding apparatus. When the leaf node of the QT is not larger than a maximum block size (MaxBTSize) of a root node permitted in the BT, the leaf node may be further split into at least one of the BT structure or the TT structure. A plurality of split directions may be present in the BT structure and/or the TT structure. For example, there may be two directions, i.e., a direction in which the block of the corresponding node is split horizontally and a direction in which the block of the corresponding node is split vertically. As illustrated in FIG. 2, when the MTT splitting starts, a second flag (mtt_split_flag) indicating whether the nodes are split, and a flag additionally indicating the split direction (vertical or horizontal), and/or a flag indicating a split type (binary or ternary) if the nodes are split are encoded by the entropy encoder 155 and signaled to the video decoding apparatus.

Alternatively, prior to encoding the first flag (QT_split_flag) indicating whether each node is split into four nodes of the lower layer, a CU split flag (split_cu_flag) indicating whether the node is split may also be encoded. When a value of the CU split flag (split_cu_flag) indicates that each node is not split, the block of the corresponding node becomes the leaf node in the split tree structure and becomes the CU, which is the basic unit of encoding. When the value of the CU split flag (split_cu_flag) indicates that each node is split, the video encoding apparatus starts encoding the first flag first by the above-described scheme.

When the QTBT is used as another example of the tree structure, there may be two types, i.e., a type (i.e., symmetric horizontal splitting) in which the block of the corresponding node is horizontally split into two blocks having the same size and a type (i.e., symmetric vertical splitting) in which the block of the corresponding node is vertically split into two blocks having the same size. A split flag (split_flag) indicating whether each node of the BT structure is split into the block of the lower layer and split type information indicating a splitting type are encoded by the entropy encoder 155 and delivered to the video decoding apparatus.

Meanwhile, a type in which the block of the corresponding node is split into two blocks asymmetrical to each other may be additionally present. The asymmetrical form may include a form in which the block of the corresponding node is split into two rectangular blocks having a size ratio of 1:3 or may also include a form in which the block of the corresponding node is split in a diagonal direction.

The CU may have various sizes according to QTBT or QTBTTT splitting from the CTU. Hereinafter, a block corresponding to a CU (i.e., the leaf node of the QTBTTT) to be encoded or decoded is referred to as a "current block." As the QTBTTT splitting is adopted, a shape of the current block may also be a rectangular shape in addition to a square shape.

The predictor 120 predicts the current block to generate a prediction block. The predictor 120 includes an intra predictor 122 and an inter predictor 124.

In general, each of the current blocks in the picture may be predictively coded. In general, the prediction of the current block may be performed by using an intra prediction technology (using data from the picture including the current block) or an inter prediction technology (using data from a picture coded before the picture including the current block). The inter prediction includes both unidirectional prediction and bidirectional prediction.

Figure 3A:
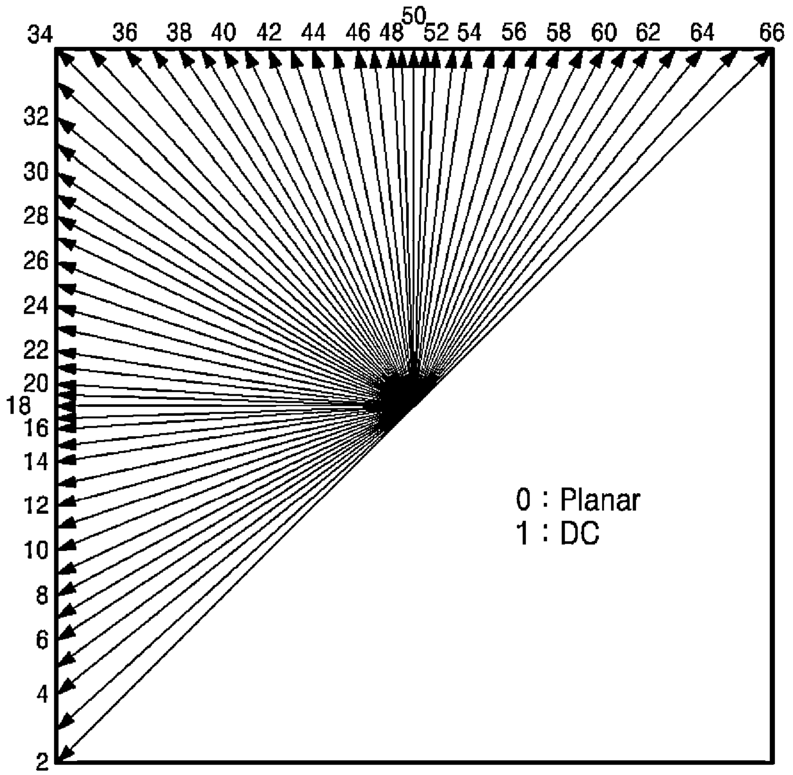
FIGS. 3A and 3B illustrate a plurality of intra prediction modes including wide-angle intra prediction modes.

The intra predictor 122 predicts pixels in the current block by using pixels (reference pixels) positioned on a neighbor of the current block in the current picture including the current block. There is a plurality of intra prediction modes according to the prediction direction. For example, as illustrated in FIG. 3A, the plurality of intra prediction modes may include 2 non-directional modes including a Planar mode and a DC mode and may include 65 directional modes. A neighboring pixel and an arithmetic equation to be used are defined differently according to each prediction mode.

Figure 3B:
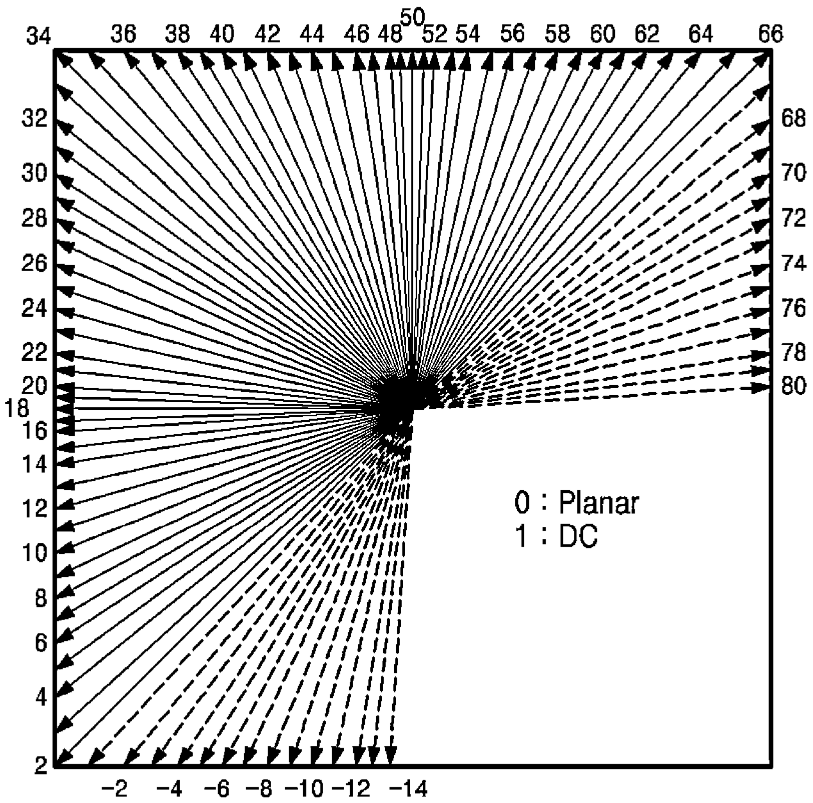

For efficient directional prediction for the current block having a rectangular shape, directional modes (#67 to #80, intra prediction modes #−1 to #−14) illustrated as dotted arrows in FIG. 3B may be additionally used. The directional modes may be referred to as "wide angle intra-prediction modes". In FIG. 3B, the arrows indicate corresponding reference samples used for the prediction and do not represent the prediction directions. The prediction direction is opposite to a direction indicated by the arrow. When the current block has the rectangular shape, the wide angle intra-prediction modes are modes in which the prediction is performed in an opposite direction to a specific directional mode without additional bit transmission. In this case, among the wide angle intra-prediction modes, some wide angle intra-prediction modes usable for the current block may be determined by a ratio of a width and a height of the current block having the rectangular shape. For example, when the current block has a rectangular shape in which the height is smaller than the width, wide angle intra-prediction modes (intra prediction modes #67 to #80) having an angle smaller than 45 degrees are usable. When the current block has a rectangular shape in which the width is larger than the height, the wide angle intra-prediction modes having an angle larger than-135 degrees are usable.

The intra predictor 122 may determine an intra prediction to be used for encoding the current block. In some examples, the intra predictor 122 may encode the current block by using multiple intra prediction modes and may also select an appropriate intra prediction mode to be used from tested modes. For example, the intra predictor 122 may calculate rate-distortion values by using a rate-distortion analysis for multiple tested intra prediction modes and may also select an intra prediction mode having best rate-distortion features among the tested modes.

The intra predictor 122 selects one intra prediction mode among a plurality of intra prediction modes and predicts the current block by using a neighboring pixel (reference pixel) and an arithmetic equation determined according to the selected intra prediction mode. Information on the selected intra prediction mode is encoded by the entropy encoder 155 and delivered to the video decoding apparatus.

The inter predictor 124 generates the prediction block for the current block by using a motion compensation process. The inter predictor 124 searches a block most similar to the current block in a reference picture encoded and decoded earlier than the current picture and generates the prediction block for the current block by using the searched block. In addition, a motion vector (MV) is generated, which corresponds to a displacement between the current bock in the current picture and the prediction block in the reference picture. In general, motion estimation is performed for a luma component, and a motion vector calculated based on the luma component is used for both the luma component and a chroma component. Motion information including information on the reference picture and information on the motion vector used for predicting the current block is encoded by the entropy encoder 155 and delivered to the video decoding apparatus.

The inter predictor 124 may also perform interpolation for the reference picture or a reference block in order to increase accuracy of the prediction. In other words, sub-samples between two contiguous integer samples are interpolated by applying filter coefficients to a plurality of contiguous integer samples including two integer samples. When a process of searching a block most similar to the current block is performed for the interpolated reference picture, not integer sample unit precision but decimal unit precision may be expressed for the motion vector. Precision or resolution of the motion vector may be set differently for each target area to be encoded, e.g., a unit such as the slice, the tile, the CTU, the CU, and the like. When such an adaptive motion vector resolution (AMVR) is applied, information on the motion vector resolution to be applied to each target area should be signaled for each target area. For example, when the target area is the CU, the information on the motion vector resolution applied for each CU is signaled. The information on the motion vector resolution may be information representing precision of a motion vector difference to be described below.

Meanwhile, the inter predictor 124 may perform inter prediction by using bi-prediction. In the case of bi-prediction, two reference pictures and two motion vectors representing a block position most similar to the current block in each reference picture are used. The inter predictor 124 selects a first reference picture and a second reference picture from reference picture list 0 (RefPicList0) and reference picture list 1 (RefPicList1), respectively. The inter predictor 124 also searches blocks most similar to the current blocks in the respective reference pictures to generate a first reference block and a second reference block. In addition, the prediction block for the current block is generated by averaging or weighted-averaging the first reference block and the second reference block. In addition, motion information including information on two reference pictures used for predicting the current block and including information on two motion vectors is delivered to the entropy encoder 155. Here, reference picture list 0 may be constituted by pictures before the current picture in a display order among pre-reconstructed pictures, and reference picture list 1 may be constituted by pictures after the current picture in the display order among the pre-reconstructed pictures. However, although not particularly limited thereto, the pre-reconstructed pictures after the current picture in the display order may be additionally included in reference picture list 0. Inversely, the pre-reconstructed pictures before the current picture may also be additionally included in reference picture list 1.

In order to minimize a bit quantity consumed for encoding the motion information, various methods may be used.

For example, when the reference picture and the motion vector of the current block are the same as the reference picture and the motion vector of the neighboring block, information capable of identifying the neighboring block is encoded to deliver the motion information of the current block to the video decoding apparatus. Such a method is referred to as a merge mode.

In the merge mode, the inter predictor 124 selects a predetermined number of merge candidate blocks (hereinafter, referred to as a "merge candidate") from the neighboring blocks of the current block.

Figure 4:
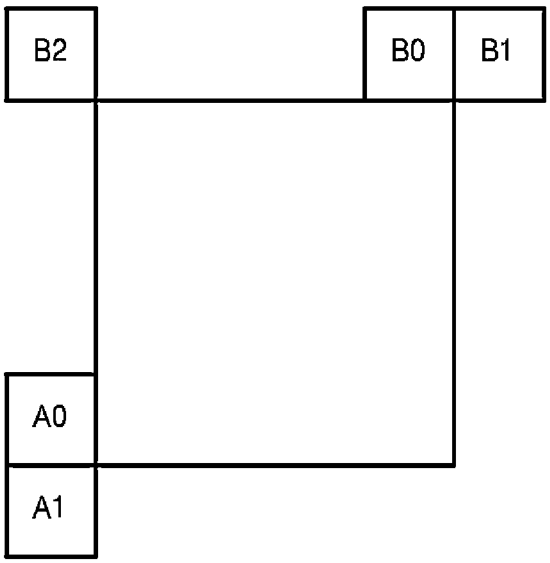
FIG. 4 illustrates neighboring blocks of a current block.

As a neighboring block for deriving the merge candidate, all or some of a left block A0, a bottom left block A1, a top block B0, a top right block B1, and a top left block B2 adjacent to the current block in the current picture may be used as illustrated in FIG. 4. Further, a block positioned within the reference picture (may be the same as or different from the reference picture used for predicting the current block) other than the current picture at which the current block is positioned may also be used as the merge candidate. For example, a co-located block with the current block within the reference picture or blocks adjacent to the co-located block may be additionally used as the merge candidate. If the number of merge candidates selected by the method described above is smaller than a preset number, a zero vector is added to the merge candidate.

The inter predictor 124 configures a merge list including a predetermined number of merge candidates by using the neighboring blocks. A merge candidate to be used as the motion information of the current block is selected from the merge candidates included in the merge list, and merge index information for identifying the selected candidate is generated. The generated merge index information is encoded by the entropy encoder 155 and delivered to the video decoding apparatus.

A merge skip mode is a special case of the merge mode. After quantization, when all transform coefficients for entropy encoding are close to zero, only the neighboring block selection information is transmitted without transmitting residual signals. By using the merge skip mode, it is possible to achieve a relatively high encoding efficiency for images with slight motion, still images, screen content images, and the like.

Hereafter, the merge mode and the merge skip mode are collectively referred to as the merge/skip mode.

Another method for encoding the motion information is an advanced motion vector prediction (AMVP) mode.

In the AMVP mode, the inter predictor 124 derives motion vector predictor candidates for the motion vector of the current block by using the neighboring blocks of the current block. As a neighboring block used for deriving the motion vector predictor candidates, all or some of a left block A0, a bottom left block A1, a top block B0, a top right block B1, and a top left block B2 adjacent to the current block in the current picture illustrated in FIG. 4 may be used. Further, a block positioned within the reference picture (may be the same as or different from the reference picture used for predicting the current block) other than the current picture at which the current block is positioned may also be used as the neighboring block used for deriving the motion vector predictor candidates. For example, a co-located block with the current block within the reference picture or blocks adjacent to the co-located block may be used. If the number of motion vector candidates selected by the method described above is smaller than a preset number, a zero vector is added to the motion vector candidate.

The inter predictor 124 derives the motion vector predictor candidates by using the motion vector of the neighboring blocks and determines motion vector predictor for the motion vector of the current block by using the motion vector predictor candidates. In addition, a motion vector difference is calculated by subtracting motion vector predictor from the motion vector of the current block.

The motion vector predictor may be acquired by applying a pre-defined function (e.g., center value and average value computation, and the like) to the motion vector predictor candidates. In this case, the video decoding apparatus also knows the pre-defined function. Further, since the neighboring block used for deriving the motion vector predictor candidate is a block in which encoding and decoding are already completed, the video decoding apparatus may also already know the motion vector of the neighboring block. Therefore, the video encoding apparatus does not need to encode information for identifying the motion vector predictor candidate. Accordingly, in this case, information on the motion vector difference and information on the reference picture used for predicting the current block are encoded.

Meanwhile, the motion vector predictor may also be determined by a scheme of selecting any one of the motion vector predictor candidates. In this case, information for identifying the selected motion vector predictor candidate is additional encoded jointly with the information on the motion vector difference and the information on the reference picture used for predicting the current block.

The subtractor 130 generates a residual block by subtracting the prediction block generated by the intra predictor 122 or the inter predictor 124 from the current block.

The transformer 140 transforms residual signals in a residual block having pixel values of a spatial domain into transform coefficients of a frequency domain. The transformer 140 may transform residual signals in the residual block by using a total size of the residual block as a transform unit or also split the residual block into a plurality of subblocks and may perform the transform by using the subblock as the transform unit. Alternatively, the residual block is divided into two subblocks, which are a transform area and a non-transform area, to transform the residual signals by using only the transform area subblock as the transform unit. Here, the transform area subblock may be one of two rectangular blocks having a size ratio of 1:1 based on a horizontal axis (or vertical axis). In this case, a flag (cu_sbt_flag) indicates that only the subblock is transformed, and directional (vertical/horizontal) information (cu_sbt_horizontal_flag) and/or positional information (cu_sbt_pos_flag) are encoded by the entropy encoder 155 and signaled to the video decoding apparatus. Further, a size of the transform area subblock may have a size ratio of 1:3 based on the horizontal axis (or vertical axis). In this case, a flag (cu_sbt_quad_flag) dividing the corresponding splitting is additionally encoded by the entropy encoder 155 and signaled to the video decoding apparatus.

Meanwhile, the transformer 140 may perform the transform for the residual block individually in a horizontal direction and a vertical direction. For the transform, various types of transform functions or transform matrices may be used. For example, a pair of transform functions for horizontal transform and vertical transform may be defined as a multiple transform set (MTS). The transformer 140 may select one transform function pair having highest transform efficiency in the MTS and may transform the residual block in each of the horizontal and vertical directions. Information (mts_idx) on the transform function pair in the MTS is encoded by the entropy encoder 155 and signaled to the video decoding apparatus.

The quantizer 145 quantizes the transform coefficients output from the transformer 140 using a quantization parameter and outputs the quantized transform coefficients to the entropy encoder 155. The quantizer 145 may also immediately quantize the related residual block without the transform for any block or frame. The quantizer 145 may also apply different quantization coefficients (scaling values) according to positions of the transform coefficients in the transform block. A quantization matrix applied to quantized transform coefficients arranged in 2 dimensional may be encoded and signaled to the video decoding apparatus.

The rearrangement unit 150 may perform realignment of coefficient values for quantized residual values.

The rearrangement unit 150 may change a 2D coefficient array to a 1D coefficient sequence by using coefficient scanning. For example, the rearrangement unit 150 may output the 1D coefficient sequence by scanning a DC coefficient to a high-frequency domain coefficient by using a zig-zag scan or a diagonal scan. According to the size of the transform unit and the intra prediction mode, vertical scan of scanning a 2D coefficient array in a column direction and horizontal scan of scanning a 2D block type coefficient in a row direction may also be used instead of the zig-zag scan. In other words, according to the size of the transform unit and the intra prediction mode, a scan method to be used may be determined among the zig-zag scan, the diagonal scan, the vertical scan, and the horizontal scan.

The entropy encoder 155 generates a bitstream by encoding a sequence of 1D quantized transform coefficients output from the rearrangement unit 150 by using various encoding schemes including a Context-based Adaptive Binary Arithmetic Code (CABAC), an Exponential Golomb, or the like.

Further, the entropy encoder 155 encodes information, such as a CTU size, a CTU split flag, a QT split flag, an MTT split type, an MTT split direction, etc., related to the block splitting to allow the video decoding apparatus to split the block equally to the video encoding apparatus. Further, the entropy encoder 155 encodes information on a prediction type indicating whether the current block is encoded by intra prediction or inter prediction. The entropy encoder 155 encodes intra prediction information (i.e., information on an intra prediction mode) or inter prediction information (in the case of the merge mode, a merge index and in the case of the AMVP mode, information on the reference picture index and the motion vector difference) according to the prediction type. Further, the entropy encoder 155 encodes information related to quantization, i.e., information on the quantization parameter and information on the quantization matrix.

The inverse quantizer 160 dequantizes the quantized transform coefficients output from the quantizer 145 to generate the transform coefficients. The inverse transformer 165 transforms the transform coefficients output from the inverse quantizer 160 into a spatial domain from a frequency domain to reconstruct the residual block.

The adder 170 adds the reconstructed residual block and the prediction block generated by the predictor 120 to reconstruct the current block. Pixels in the reconstructed current block may be used as reference pixels when intra-predicting a next-order block.

The loop filter unit 180 performs filtering for the reconstructed pixels in order to reduce blocking artifacts, ringing artifacts, blurring artifacts, etc., which occur due to block based prediction and transform/quantization. The loop filter unit 180 as an in-loop filter may include all or some of a deblocking filter 182, a sample adaptive offset (SAO) filter 184, and an adaptive loop filter (ALF) 186.

The deblocking filter 182 filters a boundary between the reconstructed blocks in order to remove a blocking artifact, which occurs due to block unit encoding/decoding, and the SAO filter 184 and the ALF 186 perform additional filtering for a deblocked filtered video. The SAO filter 184 and the ALF 186 are filters used for compensating differences between the reconstructed pixels and original pixels, which occur due to lossy coding. The SAO filter 184 applies an offset as a CTU unit to enhance a subjective image quality and encoding efficiency. On the other hand, the ALF 186 performs block unit filtering and compensates distortion by applying different filters by dividing a boundary of the corresponding block and a degree of a change amount. Information on filter coefficients to be used for the ALF may be encoded and signaled to the video decoding apparatus.

The reconstructed block filtered through the deblocking filter 182, the SAO filter 184, and the ALF 186 is stored in the memory 190. When all blocks in one picture are reconstructed, the reconstructed picture may be used as a reference picture for inter predicting a block within a picture to be encoded afterwards.

Figure 5:
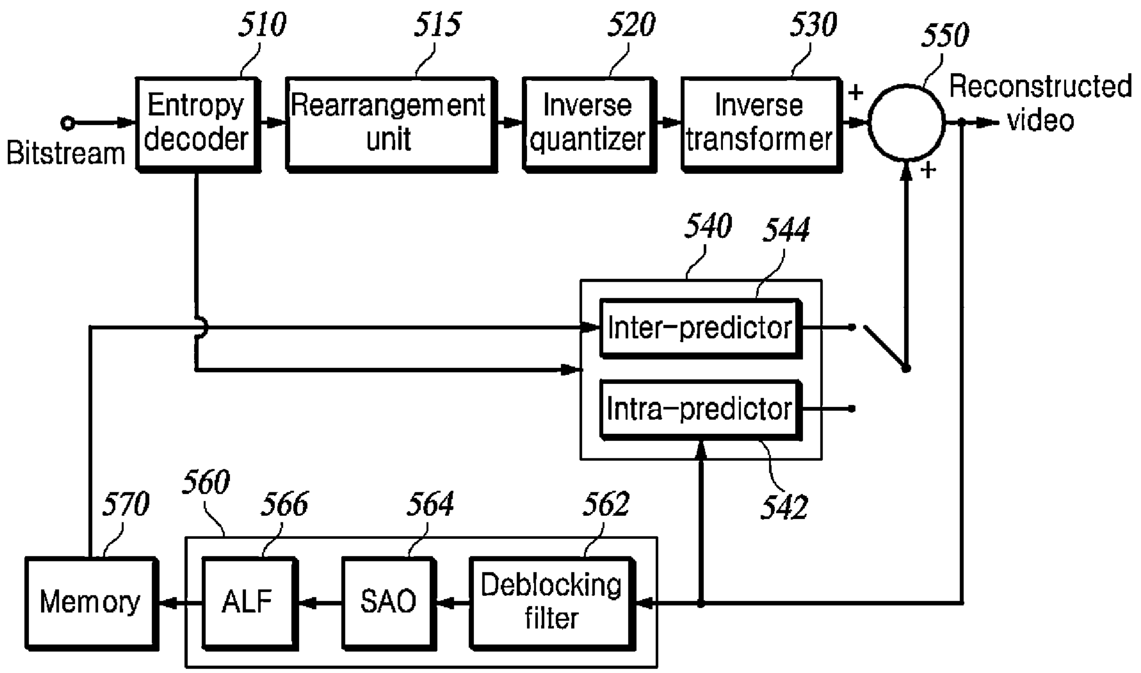
FIG. 5 is a block diagram of a video decoding apparatus that may implement the techniques of the present disclosure.

FIG. 5 is a functional block diagram of a video decoding apparatus that may implement the technologies of the present disclosure. Hereinafter, referring to FIG. 5, the video decoding apparatus and components of the apparatus are described.

The video decoding apparatus may include an entropy decoder 510, a rearrangement unit 515, an inverse quantizer 520, an inverse transformer 530, a predictor 540, an adder 550, a loop filter unit 560, and a memory 570.

Similar to the video encoding apparatus of FIG. 1, each component of the video decoding apparatus may be implemented as hardware or software or implemented as a combination of hardware and software. Further, a function of each component may be implemented as the software, and a microprocessor may also be implemented to execute the function of the software corresponding to each component.

The entropy decoder 510 extracts information related to block splitting by decoding the bitstream generated by the video encoding apparatus to determine a current block to be decoded and extracts prediction information required for reconstructing the current block and information on the residual signals.

The entropy decoder 510 determines the size of the CTU by extracting information on the CTU size from a sequence parameter set (SPS) or a picture parameter set (PPS) and splits the picture into CTUs having the determined size. In addition, the CTU is determined as a highest layer of the tree structure, i.e., a root node, and split information for the CTU may be extracted to split the CTU by using the tree structure.

For example, when the CTU is split by using the QTBTTT structure, a first flag (QT_split_flag) related to splitting of the QT is first extracted to split each node into four nodes of the lower layer. In addition, a second flag (mtt_split_flag), a split direction (vertical/horizontal), and/or a split type (binary/ternary) related to splitting of the MTT are extracted with respect to the node corresponding to the leaf node of the QT to split the corresponding leaf node into an MTT structure. As a result, each of the nodes below the leaf node of the QT is recursively split into the BT or TT structure.

As another example, when the CTU is split by using the QTBTTT structure, a CU split flag (split_cu_flag) indicating whether the CU is split is extracted. When the corresponding block is split, the first flag (QT_split_flag) may also be extracted. During a splitting process, with respect to each node, recursive MTT splitting of 0 times or more may occur after recursive QT splitting of 0 times or more. For example, with respect to the CTU, the MTT splitting may immediately occur, or on the contrary, only QT splitting of multiple times may also occur.

As another example, when the CTU is split by using the QTBT structure, the first flag (QT_split_flag) related to the splitting of the QT is extracted to split each node into four nodes of the lower layer. In addition, a split flag (split_flag) indicating whether the node corresponding to the leaf node of the QT is further split into the BT, and split direction information are extracted.

Meanwhile, when the entropy decoder 510 determines a current block to be decoded by using the splitting of the tree structure, the entropy decoder 510 extracts information on a prediction type indicating whether the current block is intra predicted or inter predicted. When the prediction type information indicates the intra prediction, the entropy decoder 510 extracts a syntax element for intra prediction information (intra prediction mode) of the current block. When the prediction type information indicates the inter prediction, the entropy decoder 510 extracts information representing a syntax element for inter prediction information, i.e., a motion vector and a reference picture to which the motion vector refers.

Further, the entropy decoder 510 extracts quantization related information and extracts information on the quantized transform coefficients of the current block as the information on the residual signals.

The rearrangement unit 515 may change a sequence of 1D quantized transform coefficients entropy-decoded by the entropy decoder 510 to a 2D coefficient array (i.e., block) again in a reverse order to the coefficient scanning order performed by the video encoding apparatus.

The inverse quantizer 520 dequantizes the quantized transform coefficients and dequantizes the quantized transform coefficients by using the quantization parameter. The inverse quantizer 520 may also apply different quantization coefficients (scaling values) to the quantized transform coefficients arranged in 2D. The inverse quantizer 520 may perform dequantization by applying a matrix of the quantization coefficients (scaling values) from the video encoding apparatus to a 2D array of the quantized transform coefficients.

The inverse transformer 530 generates the residual block for the current block by reconstructing the residual signals by inversely transforming the dequantized transform coefficients into the spatial domain from the frequency domain.

Further, when the inverse transformer 530 inversely transforms a partial area (subblock) of the transform block, the inverse transformer 530 extracts a flag (cu_sbt_flag) that only the subblock of the transform block is transformed, directional (vertical/horizontal) information (cu_sbt_horizontal_flag) of the subblock, and/or positional information (cu_sbt_pos_flag) of the subblock. The inverse transformer 530 also inversely transforms the transform coefficients of the corresponding subblock into the spatial domain from the frequency domain to reconstruct the residual signals and fills an area, which is not inversely transformed, with a value of "0" as the residual signals to generate a final residual block for the current block.

Further, when the MTS is applied, the inverse transformer 530 determines the transform index or the transform matrix to be applied in each of the horizontal and vertical directions by using the MTS information (mts_idx) signaled from the video encoding apparatus. The inverse transformer 530 also performs inverse transform for the transform coefficients in the transform block in the horizontal and vertical directions by using the determined transform function.

The predictor 540 may include an intra predictor 542 and an inter predictor 544. The intra predictor 542 is activated when the prediction type of the current block is the intra prediction, and the inter predictor 544 is activated when the prediction type of the current block is the inter prediction.

The intra predictor 542 determines the intra prediction mode of the current block among the plurality of intra prediction modes from the syntax element for the intra prediction mode extracted from the entropy decoder 510. The intra predictor 542 also predicts the current block by using neighboring reference pixels of the current block according to the intra prediction mode.

The inter predictor 544 determines the motion vector of the current block and the reference picture to which the motion vector refers by using the syntax element for the inter prediction mode extracted from the entropy decoder 510.

The adder 550 reconstructs the current block by adding the residual block output from the inverse transformer 530 and the prediction block output from the inter predictor 544 or the intra predictor 542. Pixels within the reconstructed current block are used as a reference pixel upon intra predicting a block to be decoded afterwards.

The loop filter unit 560 as an in-loop filter may include a deblocking filter 562, an SAO filter 564, and an ALF 566. The deblocking filter 562 performs deblocking filtering a boundary between the reconstructed blocks in order to remove the blocking artifact, which occurs due to block unit decoding. The SAO filter 564 and the ALF 566 perform additional filtering for the reconstructed block after the deblocking filtering in order to compensate differences between the reconstructed pixels and original pixels, which occur due to lossy coding. The filter coefficients of the ALF are determined by using information on filter coefficients decoded from the bitstream.

The reconstructed block filtered through the deblocking filter 562, the SAO filter 564, and the ALF 566 is stored in the memory 570. When all blocks in one picture are reconstructed, the reconstructed picture may be used as a reference picture for inter predicting a block within a picture to be encoded afterwards.

The present disclosure in some embodiments relates to encoding and decoding video images as described above. More specifically, the present disclosure provides a video coding method and an apparatus for implicitly determining partitioned regions of the current block based on information on previously reconstructed neighboring reference regions and generating predicted signals of the partitioned regions.

The following embodiments may be performed by the picture splitter 110 and the intra predictor 122 in the video encoding apparatus. Furthermore, the following embodiments may be performed by the intra predictor 542 in the video decoding apparatus.

The video encoding apparatus when performing the intra prediction of the current block, may generate signaling information related to the present embodiment in terms of optimizing rate-distortion. The video encoding apparatus may encode the signaling information by using the entropy encoder 155 and may transmit the encoded signaling information to the video decoding apparatus. The video decoding apparatus may decode the signaling information from the bitstream by using the entropy decoder 510.

In the following description, the term "target block" may be used interchangeably with the current block or coding unit (CU) as described above, or the 'target block' may mean a partial region of the coding unit.

Further, a value of true for a flag indicates a case of setting the flag to 1. Additionally, a value of false for a flag indicates a case of setting the flag to 0.

Furthermore, the aspect ratio of a block is defined as the length of the horizontal side of the block divided by the length of the vertical side.

The following embodiments are described about the video decoding apparatus but may be equally well implemented in the video encoding apparatus.

Figure 6:
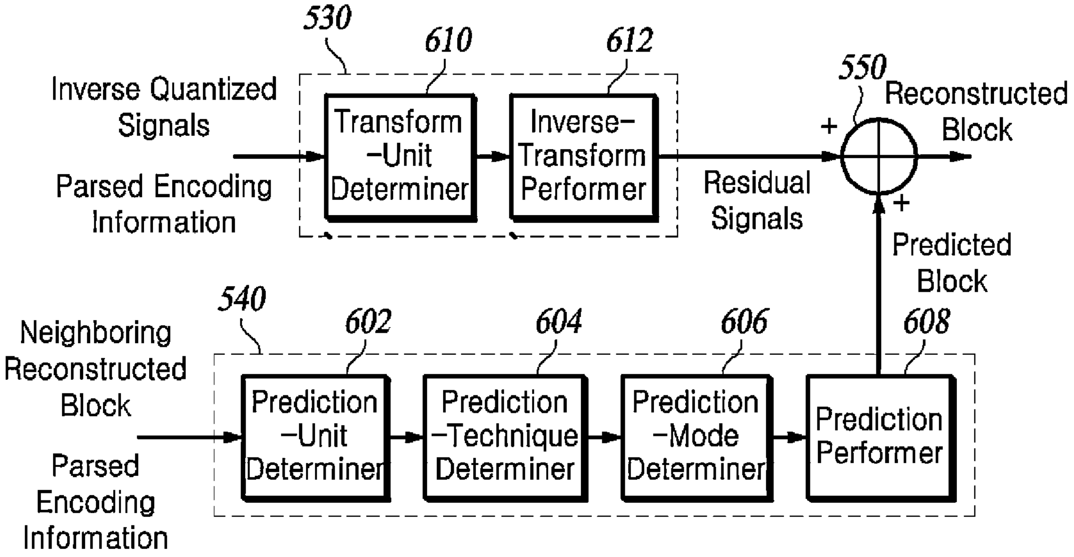
FIG. 6 is a block diagram detailing some of a video decoding apparatus according to at least one embodiment of the present disclosure.

FIG. 6 is a block diagram detailing some of a video decoding apparatus according to at least one embodiment of the present disclosure.

The video decoding apparatus according to the present embodiment may determine a prediction and transform unit and utilize the determined prediction technique and prediction mode to perform prediction and inverse transform on the current block corresponding to the determined unit, thereby generating a finally reconstructed block of the current block. The operations as illustrated in FIG. 6 may be performed by the inverse transformer 530, the intra predictor 542, and the adder 550 of the aforementioned video decoding apparatus. On the other hand, the same operations as illustrated in FIG. 6 may be performed by the inverse transformer 165, the picture splitter 110, the intra predictor 122, and the adder 170 of the video encoding apparatus. At this time, the video decoding apparatus may use encoding information parsed from the bitstream, while the video encoding apparatus may use encoding information at a higher level in terms of minimizing rate distortion. Hereinafter, for simplicity of description, embodiments of the present disclosure are described centering on the video decoding apparatus.

The prediction unit 540 as illustrated in FIG. 5 includes the intra predictor 542 and the inter predictor 544 according to a prediction technique, whereas the predictor 540 as illustrated in FIG. 6 may include all or part of a prediction-unit determiner 602, a prediction-technique determiner 604, a prediction-mode determiner 606, and a prediction performer 608. The prediction-unit determiner 602 determines a prediction unit (PU). The prediction unit may be the current block or one subblock of the subblocks partitioned from the current block. The prediction-technique determiner 604 determines a prediction technique, e.g., intra prediction, inter prediction, or intra block copy (IBC) prediction for the prediction unit. The prediction-mode determiner 606 determines a particular prediction mode of the prediction technique. The prediction performer 608 generates a prediction block of the current block according to the determined prediction mode.

The inverse transformer 530 includes a transform-unit determiner 610 and an inverse-transform performer 612. The transform-unit determiner 610 determines a transform unit (TU) for inverse quantized signals of the current block, and the inverse-transform performer 612 inversely transforms the transform unit represented by the inverse quantized signals to generate residual signals.

The adder 550 sums the prediction block and the residual signals to generate a reconstructed block. The reconstructed block may be stored in memory and utilized for the prediction of other subsequent blocks.

In one example, when the prediction technique of the current block is determined to be intra prediction, the video decoding apparatus may parse an arbitrary split flag indicating an arbitrary partitioning, and arbitrarily partition the current block based on the value of the arbitrary split flag. For example, the video decoding apparatus may implicitly partition the current block into n sub-regions (where n is an integer greater than or equal to 1) rather than a rectangle based on the information of the previously reconstructed neighboring reference region. The prediction-mode determiner 606 may determine a different intra prediction mode for each sub-region, and the prediction performer 608 may generate predicted signals for each sub-region by using the determined intra prediction modes.

The following describes a method performed by the video decoding apparatus for predicting the current block based on an implicit arbitrary partitioning. Additionally, the intra prediction mode may be used interchangeably with the 'prediction mode'.

With respect to a current block of size M×N (where M and N are natural numbers), the video decoding apparatus implicitly derives arbitrary partitioning information of the current block by using information of a previously reconstructed neighboring reference region. The video decoding apparatus may generate predicted signals by using different prediction modes for sub-regions partitioned according to the arbitrary partitioning information, and then may weight sum the predicted signals to generate final predicted signals of size M×N. In one example, the video decoding apparatus may parse an intra prediction mode for each of the partitioned sub-regions. Additionally, the video decoding apparatus may use the implicit arbitrary partitioning information to implicitly derive the prediction mode of each sub-region.

Figure 7:
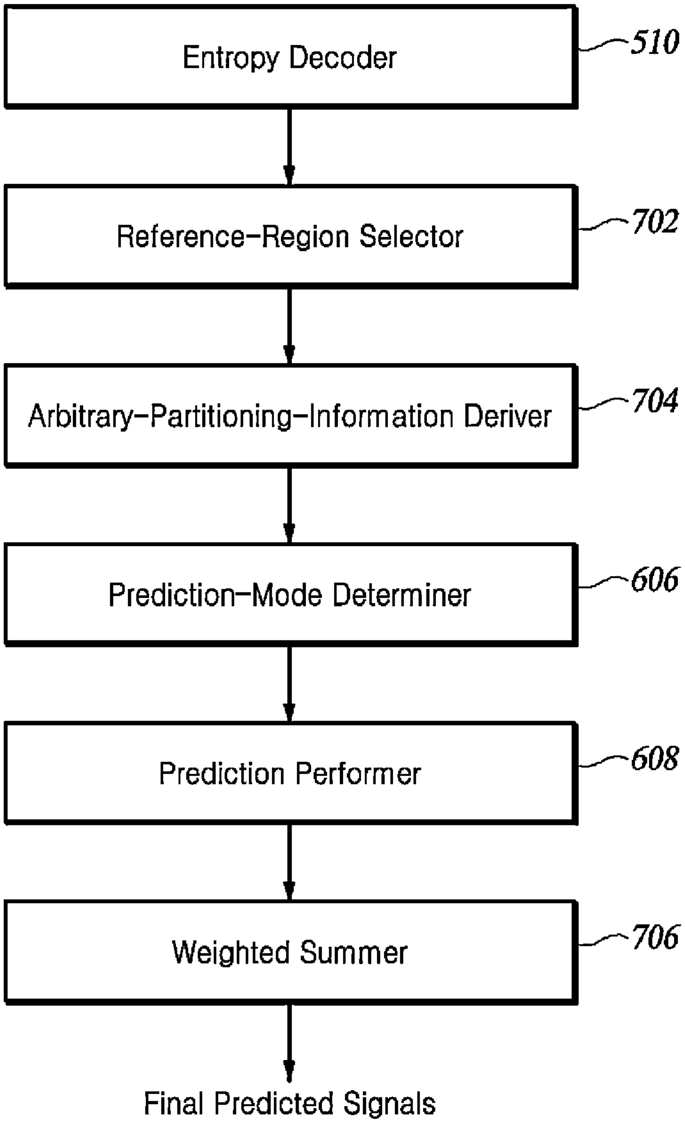
FIG. 7 is a block diagram of a video decoding apparatus utilizing arbitrary partitioning according to at least one embodiment of the present disclosure.

FIG. 7 is a block diagram of a video decoding apparatus utilizing arbitrary partitioning according to at least one embodiment of the present disclosure.

In addition to the entropy decoder 510, the prediction-mode determiner 606, and the prediction performer 608, the video decoding apparatus further includes a reference-region selector 702, an arbitrary-partitioning-information deriver 704, and a weighted summer 706. Here, the reference-region selector 702, the arbitrary-partitioning-information deriver 704, the prediction-mode determiner 606, the prediction performer 608, and the weighted summer 706 may be included in the intra predictor 542.

The entropy decoder 510 decodes the arbitrary split flag indicating an arbitrary partitioning. If the arbitrary split flag is true, the reference-region selector 702 selects a reference region neighboring the current block for deriving arbitrary partitioning information. The arbitrary-partitioning-information deriver 704 utilizes information on the selected reference region to implicitly derive the arbitrary partitioning information of the current block and then partitions the current block into sub-regions according to the derived arbitrary partitioning information. The prediction-mode determiner 606 determines the prediction mode for each sub-region. The prediction performer 608 performs prediction according to the prediction mode and generates predicted signals for each sub-region. The weighted summer 706 generates the final predicted signals of the current block by weighted summing the predicted signals of the sub-regions.

The following describes in detail the operation of the remaining components except the entropy decoder 510 when the arbitrary split flag is true.

Figure 8:
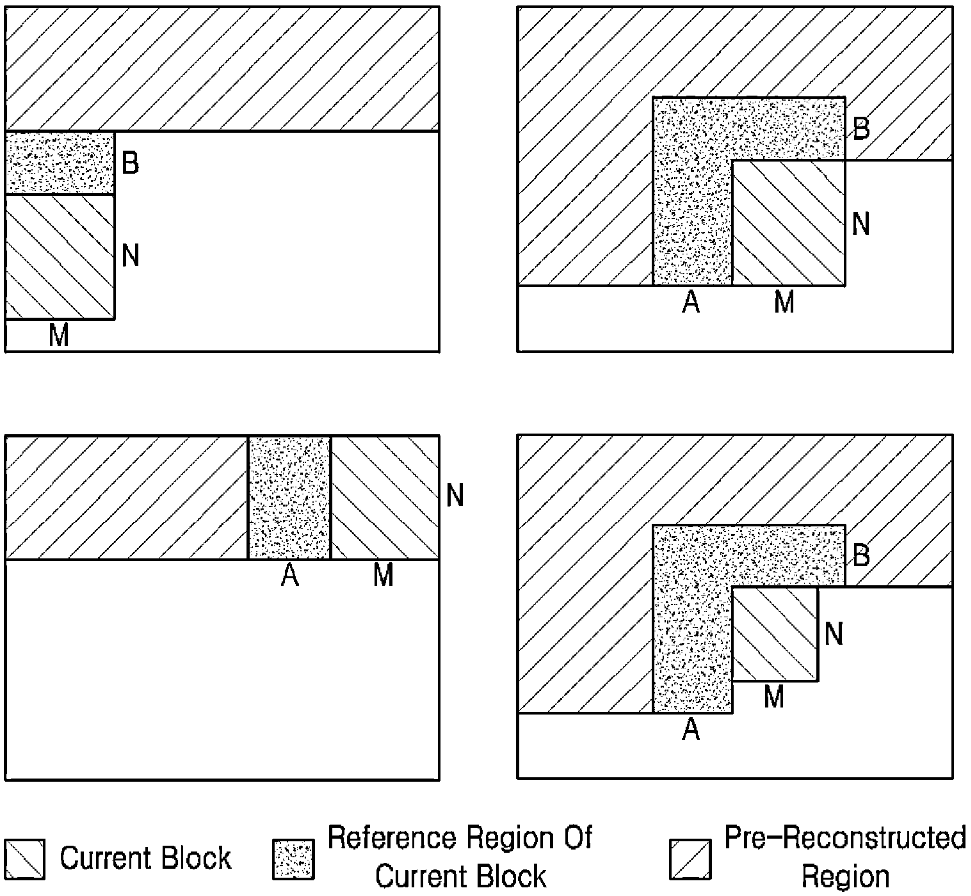
FIG. 8 is a diagram illustrating reference regions of the current block according to some embodiments of the present disclosure.

FIG. 8 is a diagram illustrating reference regions of the current block according to some embodiments of the present disclosure.

The reference-region selector 702 according to this embodiment may select a reference region neighboring the current block as illustrated in FIG. 8 for deriving arbitrary partitioning information. Here, A and B (wherein A and B are natural numbers) representing the reference regions may be multiples of 4. Further, A and B may be the same value or different values. If no region exists to the left or top of the current block, or if a region is not previously reconstructed, a region excluding that region may be selected as the reference region for the current block. In the examples of FIG. 8, M represents the width of the current block and N represents the height of the current block.

Figure 9:
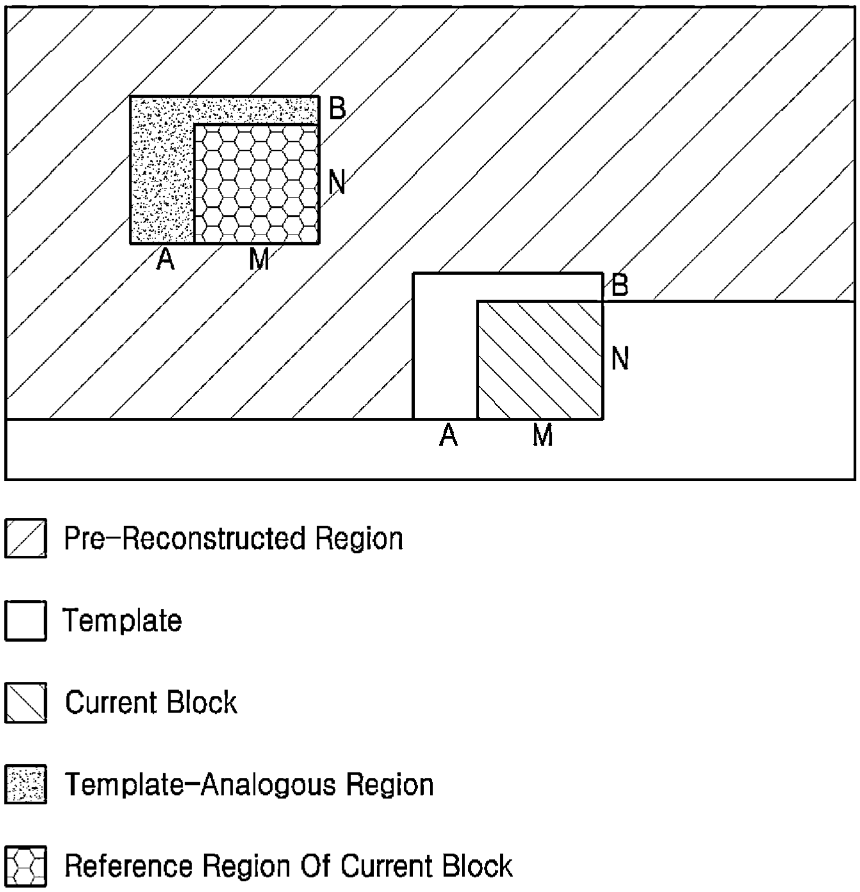
FIG. 9 is a diagram illustrating a reference region based on template matching, according to at least one embodiment of the present disclosure.

FIG. 9 is a diagram illustrating a reference region based on template matching, according to at least one embodiment of the present disclosure.

In one example, the reference region illustrated in FIG. 8 may be utilized as a template without using the reference regions illustrated in FIG. 9. As illustrated in FIG. 9, the reference-region selector 702 may use template matching to implicitly find a region analogous to the template in the previously reconstructed region in the current frame, and then may use the analogous region to select a reference region of the current block of size M×N. At this time, for use as similarity to find the analogous region, cost functions such as Mean Squared Error (MSE), Sum of Absolute Difference (SAD), and the like, between luminance values may be appropriate. Template matching may be performed on all previously reconstructed regions within the current frame. Further, the aspect ratio of the current block may determine the region within the current frame for performing template matching.

Hereinafter, the luminance value of the pixel and the pixel value may be used interchangeably.

The video decoding apparatus may determine the use of template matching by parsing a flag indicating whether to use template matching. Alternatively, among the examples in FIG. 8, where only the previously reconstructed top region of the current block is present, or only the previously reconstructed left region is present, the video decoding apparatus may implicitly use template matching to select the reference region of the current block.

Figure 10A:
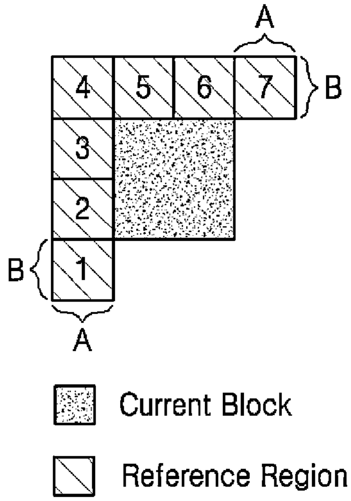
FIGS. 10A and 10B are diagrams illustrating reference subblocks according to some embodiments of the present disclosure.
Figure 10B:
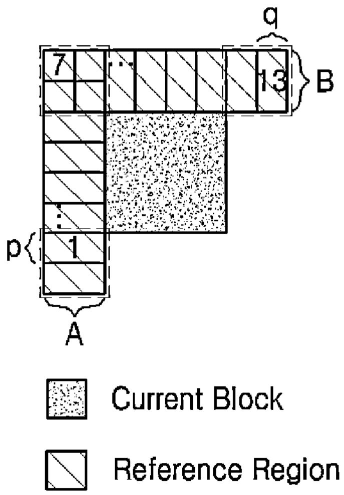

FIGS. 10A and 10B are diagrams illustrating reference subblocks according to some embodiments of the present disclosure.

In one example, the arbitrary-partitioning-information deriver 704 according to the present embodiment may select, with respect to the reference regions of the current block selected as in the examples of FIG. 8, non-overlapping A×B sized blocks as reference subblocks as in the example of FIG. 10A, and then may derive arbitrary partitioning information by using information of each reference block.

As another example, the arbitrary-partitioning-information deriver 704 may select the overlapping A×B sized blocks as reference subblocks, as shown in the example of FIG. 10B, and then may derive the arbitrary partitioning information by using the information of each reference block. In this case, the A×B sized blocks may overlap each other by any integer p or any integer q, wherein p is greater than or equal to 1 and less than or equal to B, and q is greater than or equal to 1 and less than or equal to A.

Hereinafter, the number of reference subblocks is denoted by I.

The arbitrary-partitioning-information deriver 704 may calculate, with respect to the i(1≤i≤I)th reference subblock, the mean m(i) and the variance v(i) of the previously reconstructed pixel values, and may use the mean m(i) and variance v(i) of the previously reconstructed pixel values to derive the arbitrary partitioning information. At this time, the mean m(i) and variance v(i) of the previously reconstructed pixel values may be calculated as shown in Equation 1 and Equation 2.

$$m(i) = \frac{1}{A \times B}\sum_{a=1}^{A}\sum_{b=1}^{B} s[a][b] \quad \text{[Equation 1]}$$

-continued $$v(i) = \frac{1}{A \times B}\sum_{a=1}^{A}\sum_{b=1}^{B} (s[a][b])^2 - (m(i))^2 \quad \text{[Equation 2]}$$

Here, s[a][b] represents a pixel value contained in the reference subblock of size A×B.

Figure 11A:
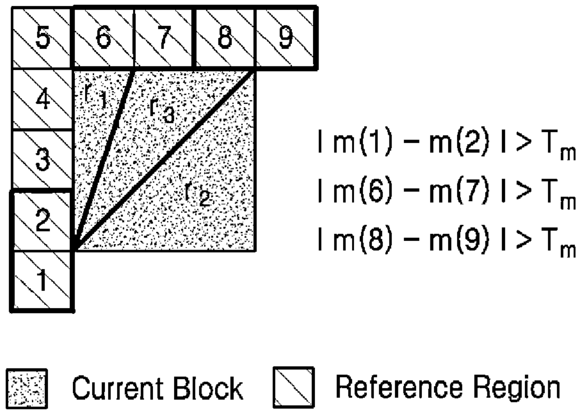
FIGS. 11A and 11B are diagrams illustrating the derivation of arbitrary partitioning information according to at least one embodiment of the present disclosure.
Figure 11B:
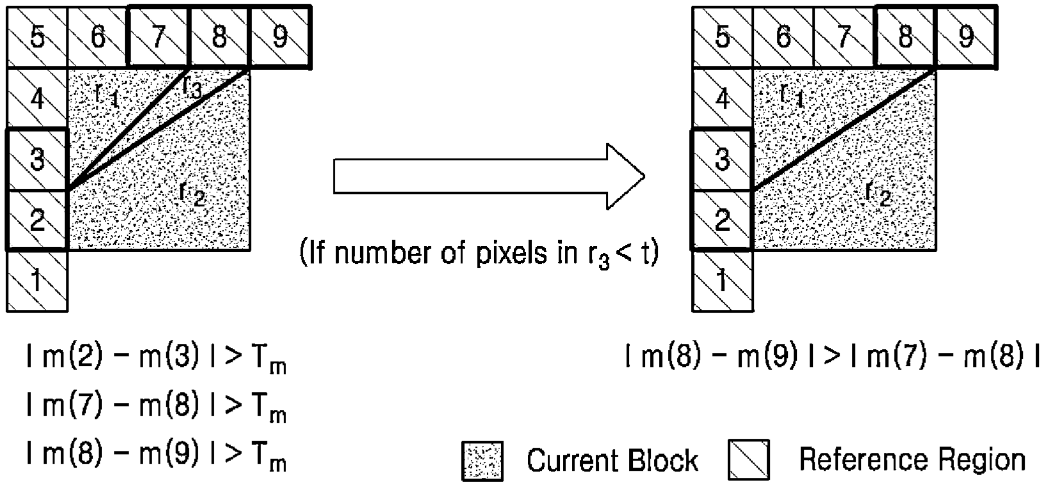

FIGS. 11A through 11B are diagrams illustrating the derivation of arbitrary partitioning information according to at least one embodiment of the present disclosure.

In one example, when there is a plurality of adjacent reference subblock pairs having greater difference or disparity between the means than a preset mean disparity threshold $T_m$, the arbitrary-partitioning-information deriver 704 may derive arbitrary partitioning information that partitions the current block into a plurality of sub-regions by boundaries within the plurality of pairs, as shown in the example of FIG. 11A. At this time, the mean disparity threshold may be signaled by the video encoding apparatus to the video decoding apparatus. Alternatively, based on the quantization parameter, the mean disparity threshold may be determined from a table predefined between the video encoding apparatus and the video decoding apparatus.

On the other hand, the arbitrary-partitioning-information deriver 704 may be responsive to the area of the partitioned sub-region being less than a predefined area threshold 't' for deriving arbitrary partitioning information to prevent that sub-region from occurring. For example, among the boundaries having a greater disparity between the means than the preset mean disparity threshold, the boundaries having an even greater disparity between the means are used as bases for deriving the arbitrary partitioning information of the current block. For example, as shown in the example of FIG. 11B, the arbitrary partitioning information of the current block may be derived based on the boundaries having an even greater disparity between the means out of the interfaces related to the partitioning of the sub-region. In this case, the area threshold may be signaled by the video encoding apparatus to the video decoding apparatus. Alternatively, the area threshold may be implicitly determined based on the aspect ratio of the current block.

Figure 12A:
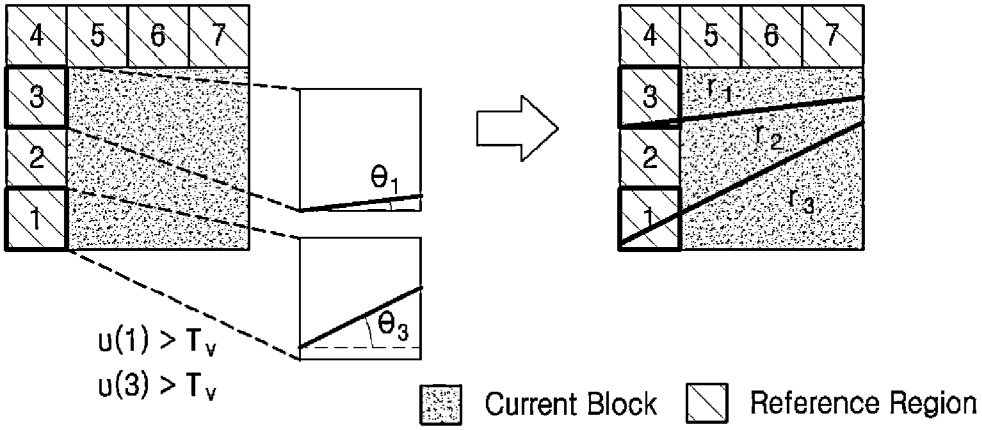
FIGS. 12A and 12B are diagrams illustrating the derivation of arbitrary partitioning information according to another embodiment of the present disclosure.
Figure 12B:
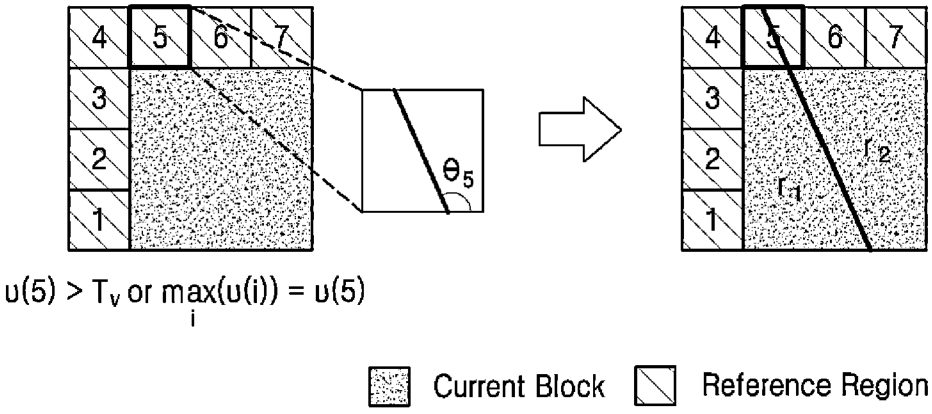

FIGS. 12A and 12B are diagrams illustrating the derivation of arbitrary partitioning information according to another embodiment of the present disclosure.

In the meantime, with respect to reference subblocks having variance greater than a predetermined variance threshold $T_v$, the arbitrary-partitioning-information deriver 704 may derive arbitrary partitioning information by utilizing a directionality in the reference subblocks, as in the example of FIG. 12A. In this case, the directionality of the reference subblocks may be derived according to a method such as, for example, a Hough transform, segmentation, or the like. The threshold may be signaled by the video encoding apparatus to the video decoding apparatus. Alternatively, the variance threshold may be determined from a table predefined between the video encoding apparatus and the video decoding apparatus, based on the quantization parameters. Further, the video encoding apparatus may signal to the video decoding apparatus a method of deriving directionality information.

As another example, the arbitrary-partitioning-information deriver 704 may derive directionality information of a reference subblock having the largest variance among the reference subblocks, as in the example of FIG. 12B, and then may use the derived directionality information to derive arbitrary partitioning information.

On the other hand, the arbitrary-partitioning-information deriver 704 may be responsive to the area of the partitioned sub-region being less than a predefined area threshold t for deriving arbitrary partitioning information to prevent that sub-region from occurring. For example, the arbitrary-partitioning-information deriver 704 may derive the directionality information in the higher reference subblocks, among the reference subblocks having a greater variance than the preset variance threshold $T_v$, which has an even greater variance, and may use the directionality information to derive the arbitrary partitioning information. In other words, the arbitrary partitioning information may be derived based on the directionality information in the reference subblocks having an even greater variance among the reference subblocks related to the partitioning of the relevant sub-region. In this case, the area threshold may be signaled by the video encoding apparatus to the video decoding apparatus. Alternatively, the area threshold may be implicitly determined based on the aspect ratio of the current block.

In one example, when deriving arbitrary partitioning information of the current block from overlapping reference subblocks as in the example of FIG. 10B, arbitrary partitioning information may be derived similar to the examples of FIGS. 12A and 12B. For example, if the variance of a plurality of adjacent subblocks is greater than a predetermined variance threshold, the arbitrary-partitioning-information deriver 704 may derive directionality information within those subblocks as in the examples of FIGS. 12A and 12B and may utilize the directionality information to derive arbitrary partitioning information.

Figure 13A:
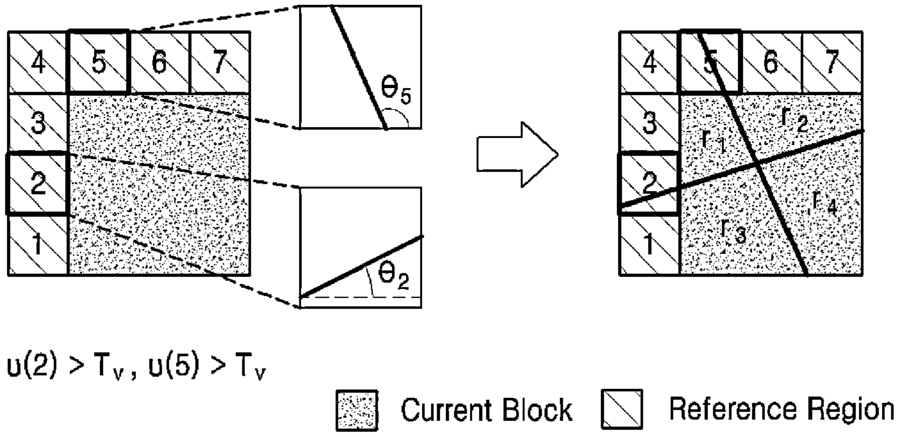
FIGS. 13A and 13B are diagrams illustrating the derivation of arbitrary partitioning information according to yet another embodiment of the present disclosure.
Figure 13B:
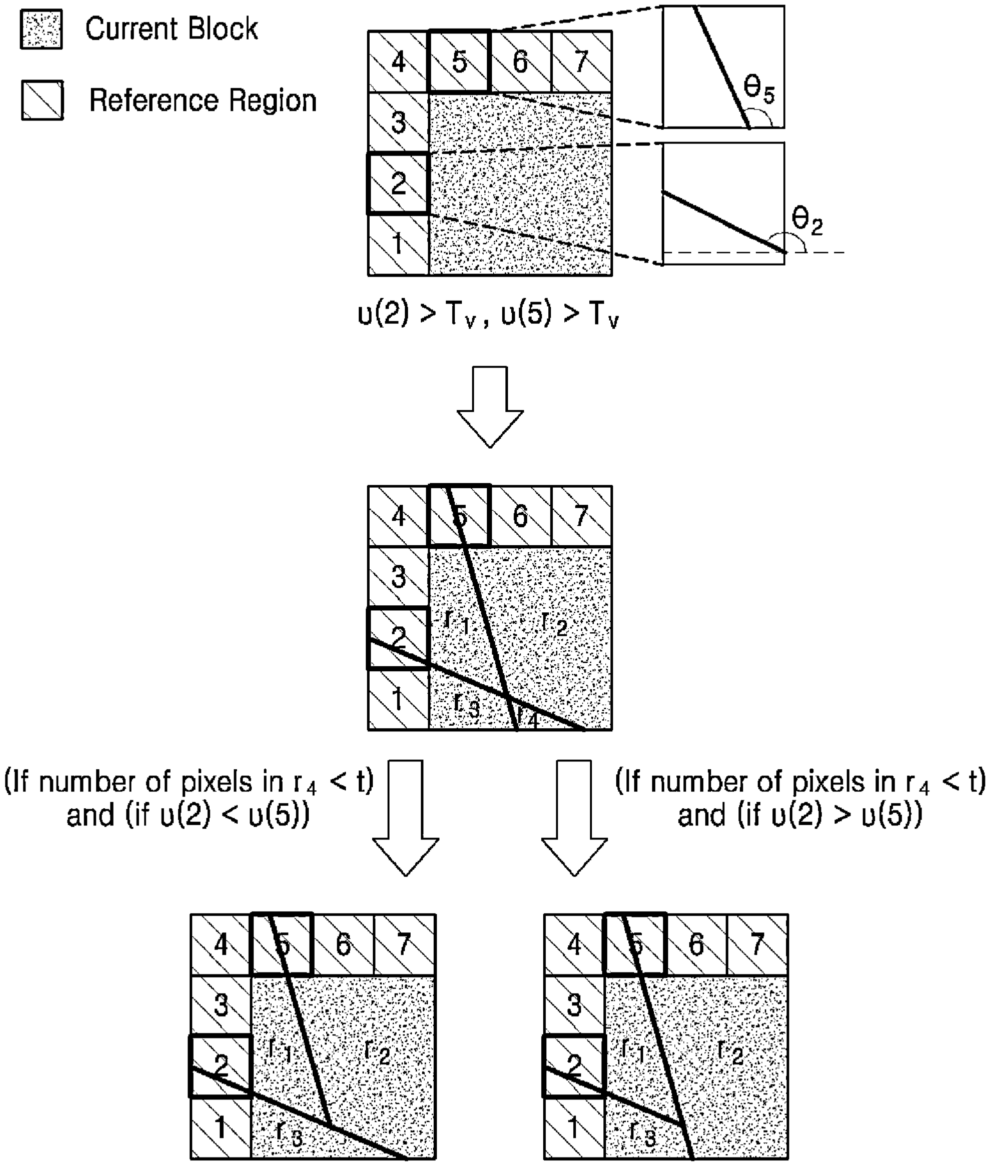

FIGS. 13A and 13B are diagrams illustrating the derivation of arbitrary partitioning information according to yet another embodiment of the present disclosure.

In one example, as shown in FIG. 13A, if a reference subblock having a variance greater than the predetermined variance threshold $T_v$ is located at the top of the current block and has a vertical directionality, and a reference subblock having a variance greater than the predetermined variance threshold Ty is located at the left of the current block and has a horizontal directionality, then the current block may be partitioned into four sub-regions. Thereafter, the prediction may be performed on the four sub-regions.

At this time, as shown in the example of FIG. 13B, if a sub-region with an area smaller than the predefined area threshold 't' exists among the four sub-regions, the arbitrary-partitioning-information deriver 704 may reflect the directionality as follows so that the sub-region with an area smaller than the predefined area threshold 't' does not exist. In other words, the arbitrary-partitioning-information deriver 704 may reflect the directionality of the reference subblock having an even greater variance among those having a greater variance than the preset variance threshold Ty to the entire current block, and may reflect the directionality of the reference subblock having a smaller variance to some portion of the current block.

Figure 14A:
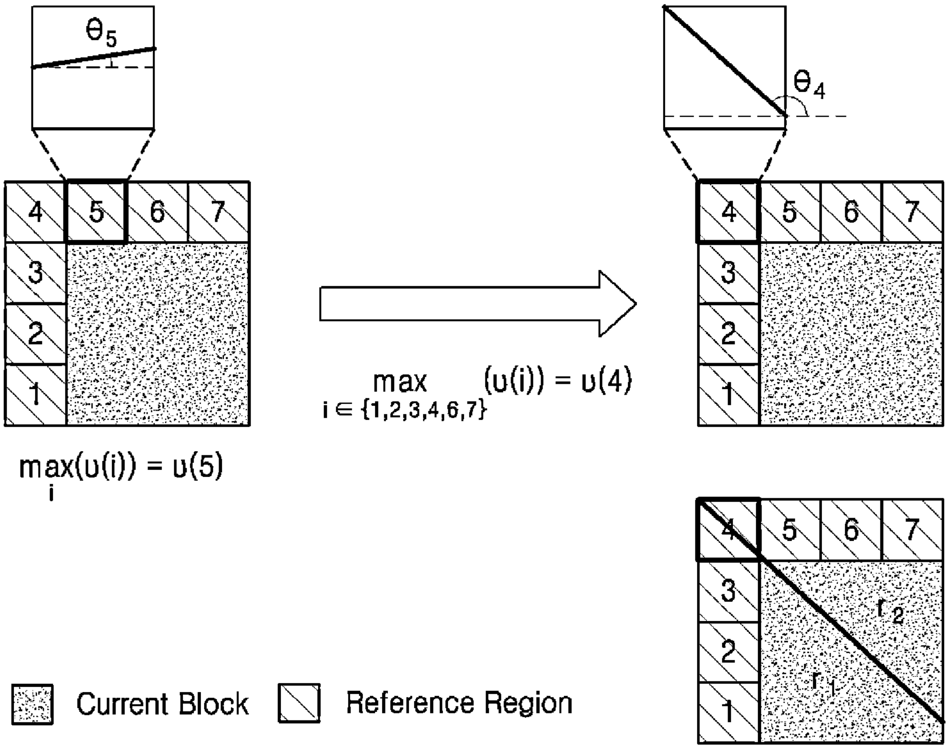
FIGS. 14A and 14B are diagrams illustrating the derivation of arbitrary partitioning information according to yet another embodiment of the present disclosure.
Figure 14B:
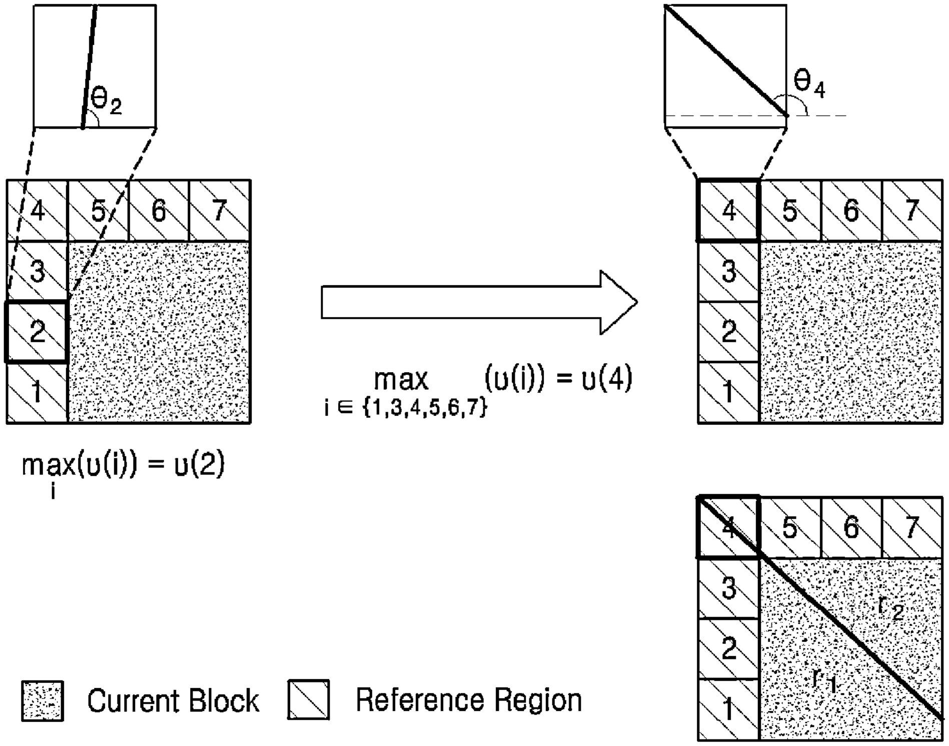

FIGS. 14A and 14B are diagrams illustrating the derivation of arbitrary partitioning information according to yet another embodiment of the present disclosure.

As one example, if the reference subblock having the largest variance is located at the top of the current block and has a horizontal directionality as in the example of FIG. 14A, or if the reference subblock having the largest variance is located to the left of the current block and has a vertical directionality as in the example of FIG. 14B, the arbitrary-partitioning-information deriver 704 may reflect the directionality as follows. The arbitrary-partitioning-information deriver 704 may derive the arbitrary partitioning information of the current block by utilizing the directionality information in, among the reference subblocks excluding the reference subblock having the largest variance, the reference subblock having the then largest variance (i.e., the second largest variance).

At this time, if the current block cannot be partitioned by using the directionality information in the subblock having the next size variance, or if a sub-region smaller than the preset threshold t exists after the current block is partitioned, the arbitrary-partitioning-information deriver 704 may repeat the process described above until the appropriate arbitrary partitioning information is derived.

As one example, the arbitrary-partitioning-information deriver 704 when deriving the arbitrary partitioning information of the current block by using the directionality information in the reference subblock, may implicitly use only the vertical direction as the directionality in the subblock located at the top of the current block, and may implicitly use only the horizontal direction as the directionality in the subblock located at the left of the current block.

In one example, during in-loop filtering of adjacent subblocks of the current block, directionality information of the current block may be derived based on whether deblocking filtering is performed. In this case, the present embodiment may utilize information on whether or not vertical deblocking filtering is to be performed with respect to the reference subblocks located to the left of the current block. Additionally, the present embodiment may utilize information on whether or not horizontal deblocking filtering is to be performed with respect to the reference subblocks located at the top of the current block. Further, with respect to the reference subblocks located at the top left of the current block, the present embodiment may utilize information on both whether or not vertical and horizontal deblocking filtering are to be performed.

Figure 15A:
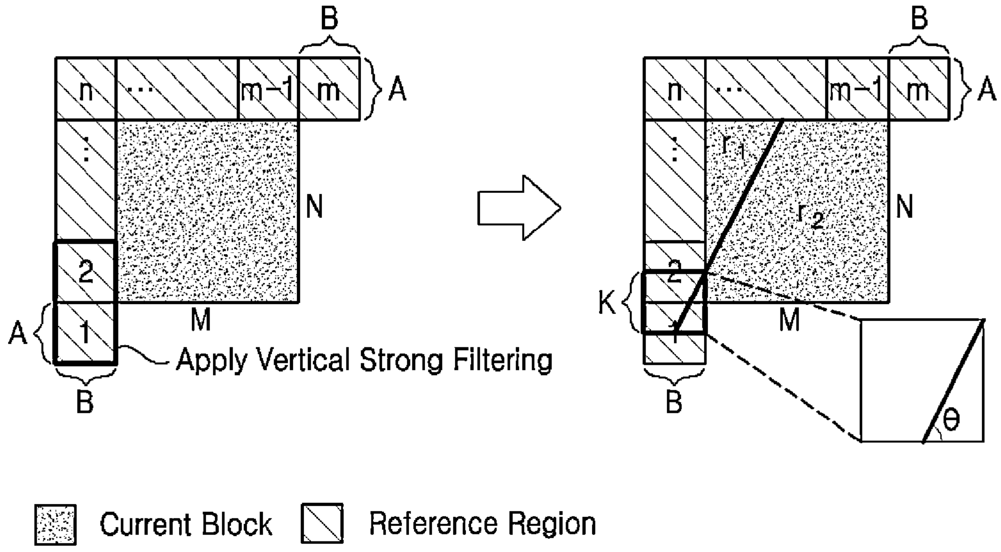
FIGS. 15A and 15B are diagrams illustrating the derivation of arbitrary partitioning information based on whether deblocking filtering is performed, according to at least one embodiment of the present disclosure.
Figure 15B:
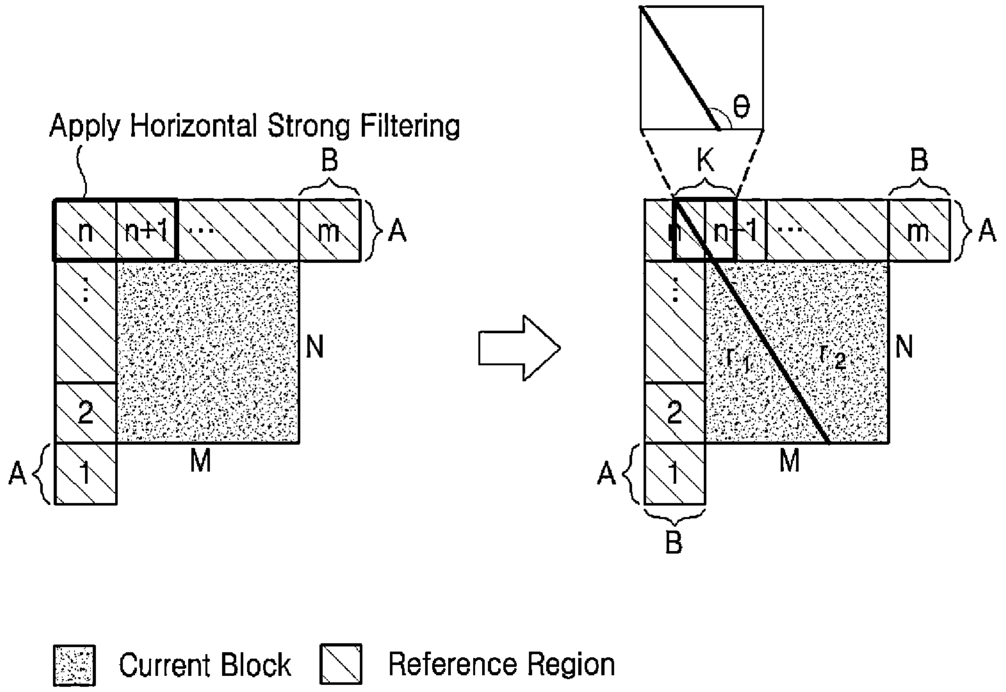

For example, as in the examples of FIGS. 15A and 15B, if strong filtering is performed on an boundary between two adjacent reference subblocks during the in-loop filtering process, the arbitrary-partitioning-information deriver 704 may derive directionality information within a subblock of size B×K or K×A that includes the boundary, and then may use the derived directionality information to derive arbitrary partitioning information.

Figure 16:
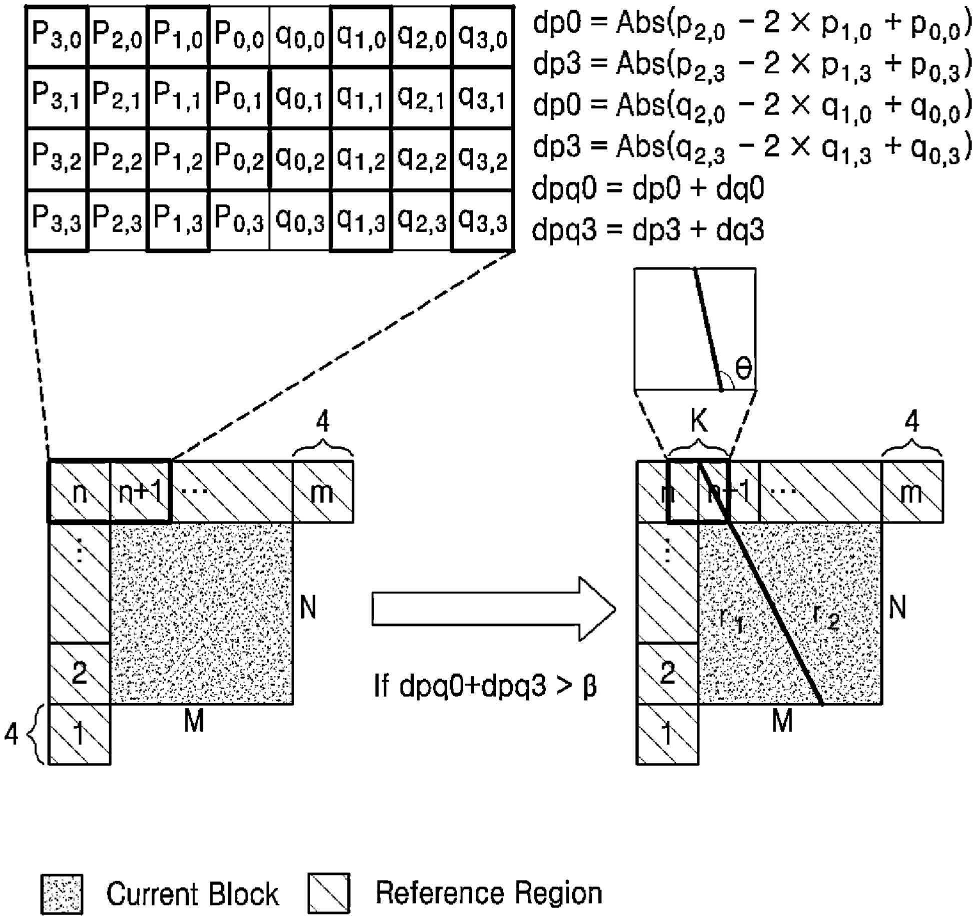
FIG. 16 is a diagram illustrating the derivation of arbitrary partitioning information based on whether deblocking filtering is performed, according to another embodiment of the present disclosure.

As an example, if deblocking filtering is not performed because the variation of the reconstructed luminance values between the reference subblocks is greater than a variation threshold B as in the example of FIG. 16, the arbitrary-partitioning-information deriver 704 may derive directionality information within the reference subblock including that boundary, and then may use the derived directionality information to derive arbitrary partitioning information. At this time, based on the quantization parameter, the variation threshold may be determined from a table predefined between the video encoding apparatus and the video decoding apparatus.

Figure 17:
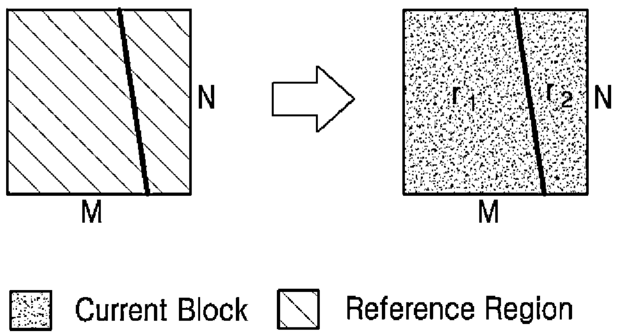
FIG. 17 is a diagram illustrating the derivation of arbitrary partitioning information based on template matching, according to at least one embodiment of the present disclosure.

FIG. 17 is a diagram illustrating the derivation of arbitrary partitioning information based on template matching, according to at least one embodiment of the present disclosure.

In one example, when a reference region of the current block is selected according to template matching, as illustrated in FIG. 9, by using a previously reconstructed adjacent region of the current block as a template, the arbitrary-partitioning-information deriver 704 may derive directionality information within the selected reference region, and then may use the derived directionality information to derive arbitrary partitioning information, as illustrated in FIG. 17. At this time, the directionality information within the reference region of the current block may be derived according to a method such as Hough transform, segmentation, or the like. Alternatively, the video encoding apparatus may signal a method of deriving directionality information to the video decoding apparatus.

Figure 18A:
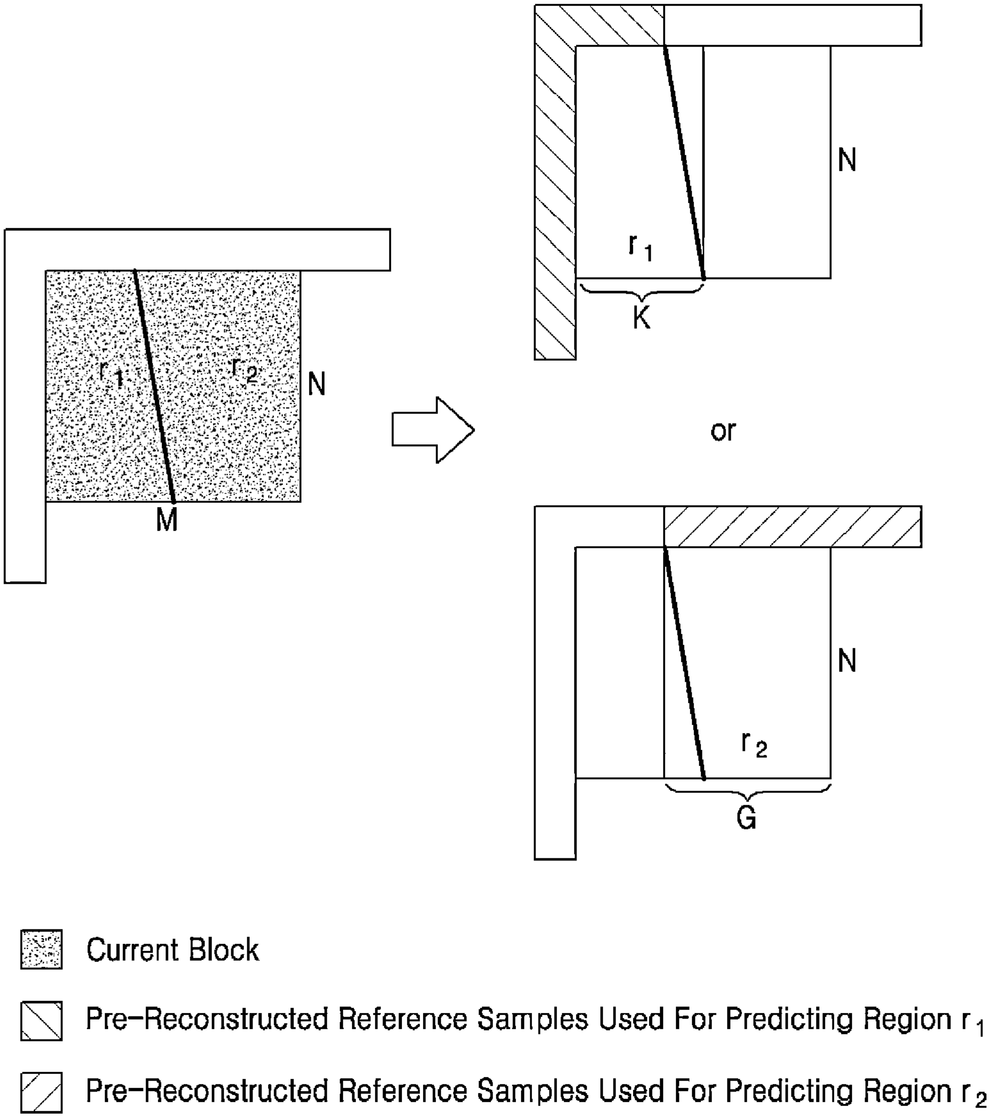
FIGS. 18A and 18B are diagrams illustrating predictions by sub-region according to at least one embodiment of the present disclosure.
Figure 18B:
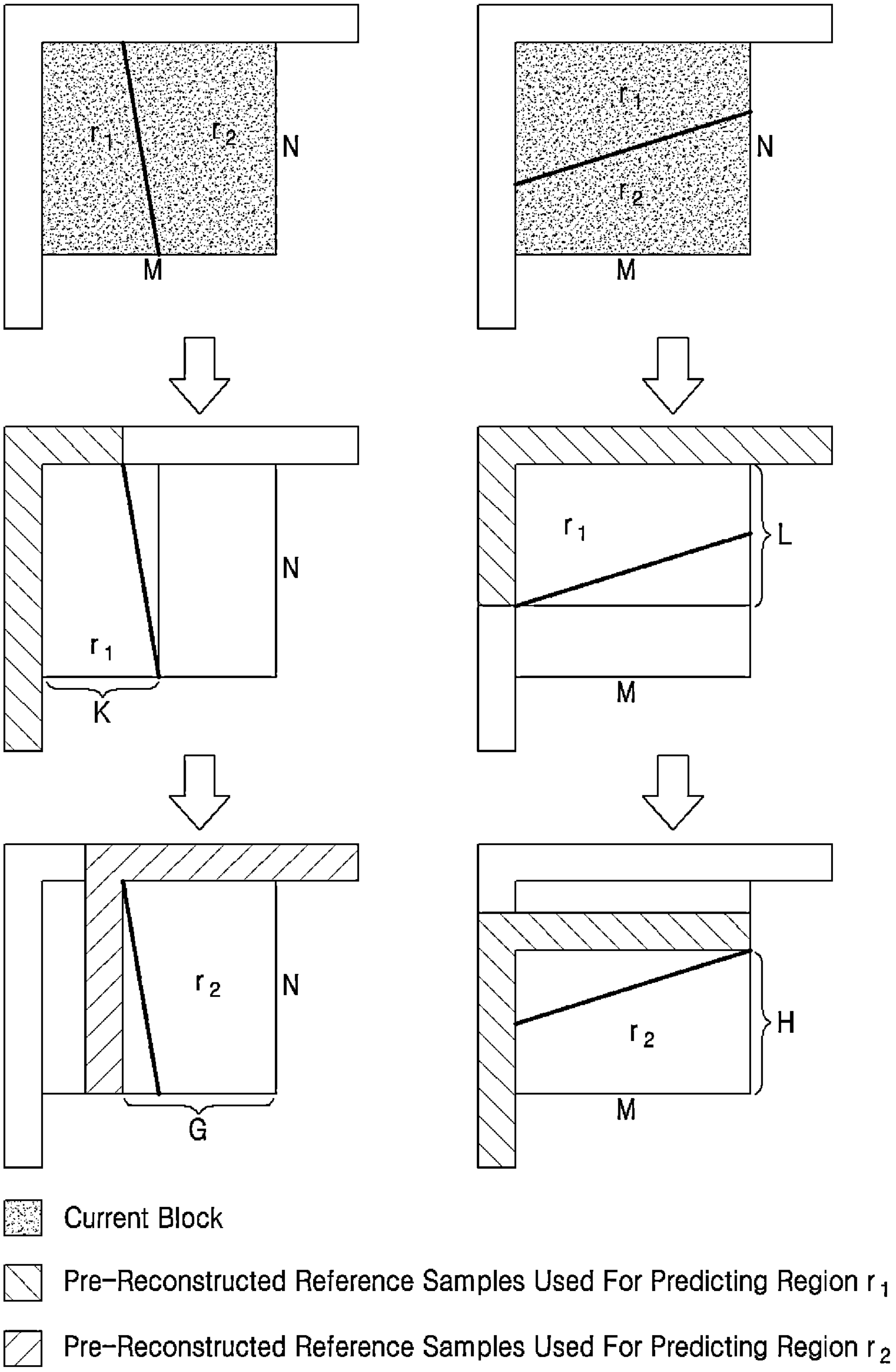

FIGS. 18A and 18B are diagrams illustrating predictions by sub-region according to at least one embodiment of the present disclosure.

The prediction-mode determiner 606 according to this embodiment may be responsive to when the current block is partitioned into two regions based on the derived arbitrary partitioning information as shown in the example of FIG. 18A, for partitioning the current block into sub-regions relative to the partitioning boundary, and then determining a prediction mode for each sub-region. Thereafter, the prediction performer 608 may use previously reconstructed reference samples neighboring each sub-region to generate predicted signals for each sub-region.

As another example, the prediction-mode determiner 606 may be responsive to when the current block is partitioned into two regions based on the arbitrary partitioning information as shown in the example of FIG. 18B, for partitioning the current block into sub-regions relative to the partitioning interface, and then determining a prediction mode for each sub-region. Thereafter, the video decoding apparatus may sequentially perform prediction and reconstruction of the sub-regions in a raster scan order by using previously reconstructed neighboring reference samples of each sub-region and thereby may generate predicted signals for each sub-region.

Figure 19A:
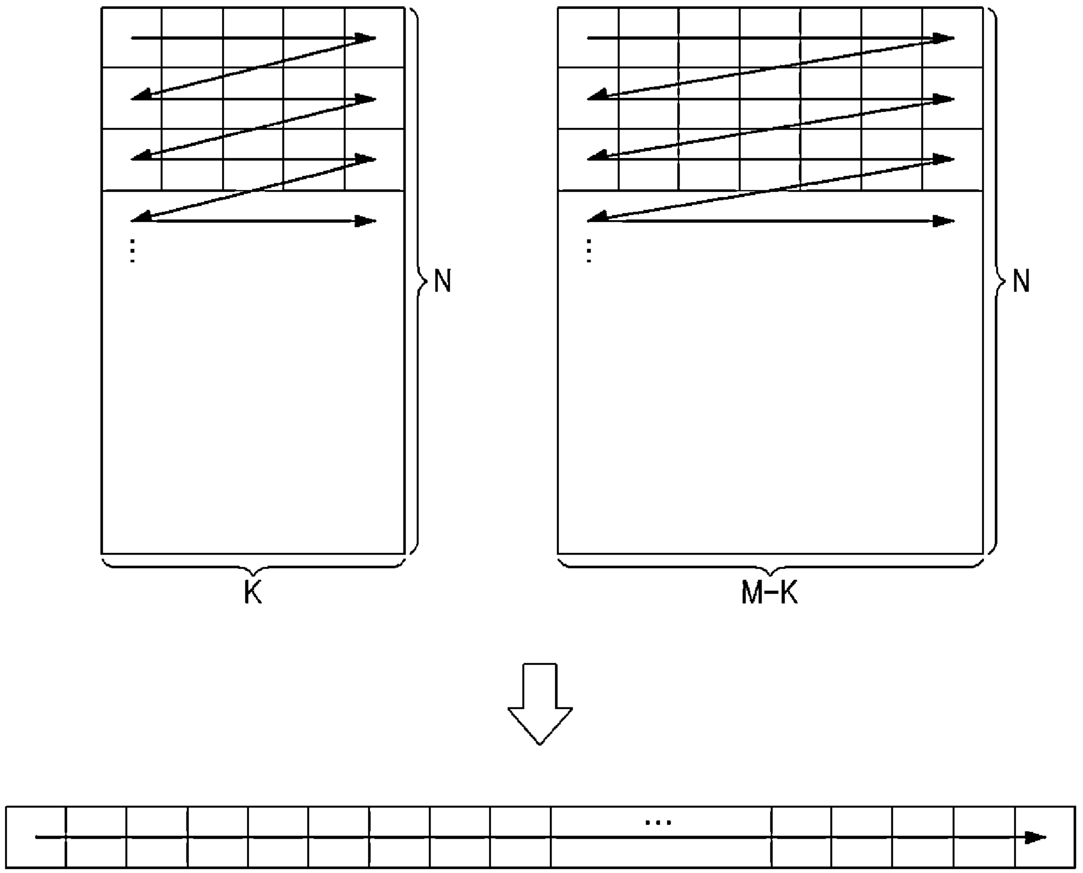
FIGS. 19A and 19B are diagrams illustrating transform units according to at least one embodiment of the present disclosure.
Figure 19B:
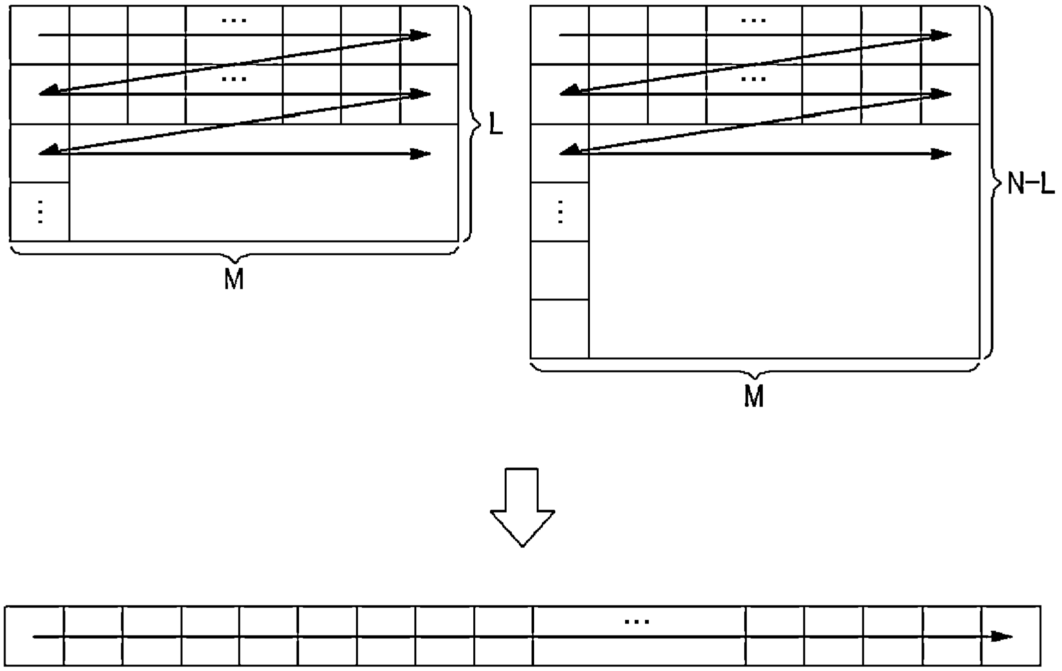

Meanwhile, in sequentially predicting and reconstructing the respective sub-regions as in the example of FIG. 18B, if K or L is not a multiple of 2, the video decoding apparatus may read each pixel value in the transform process by a transform unit of K×N, (M−K)×N, M×L, or M×(N−L) in a raster scan order as in the examples of FIGS. 19A and 19B, transform each pixel value to a 1D format and then may perform a 1D inverse transform.

As another example, in sequentially predicting and reconstructing the respective sub-regions as in the example of FIG. 18B, if K or L is not 2", a transform that is non-power of 2 may be applied.

Figure 20:
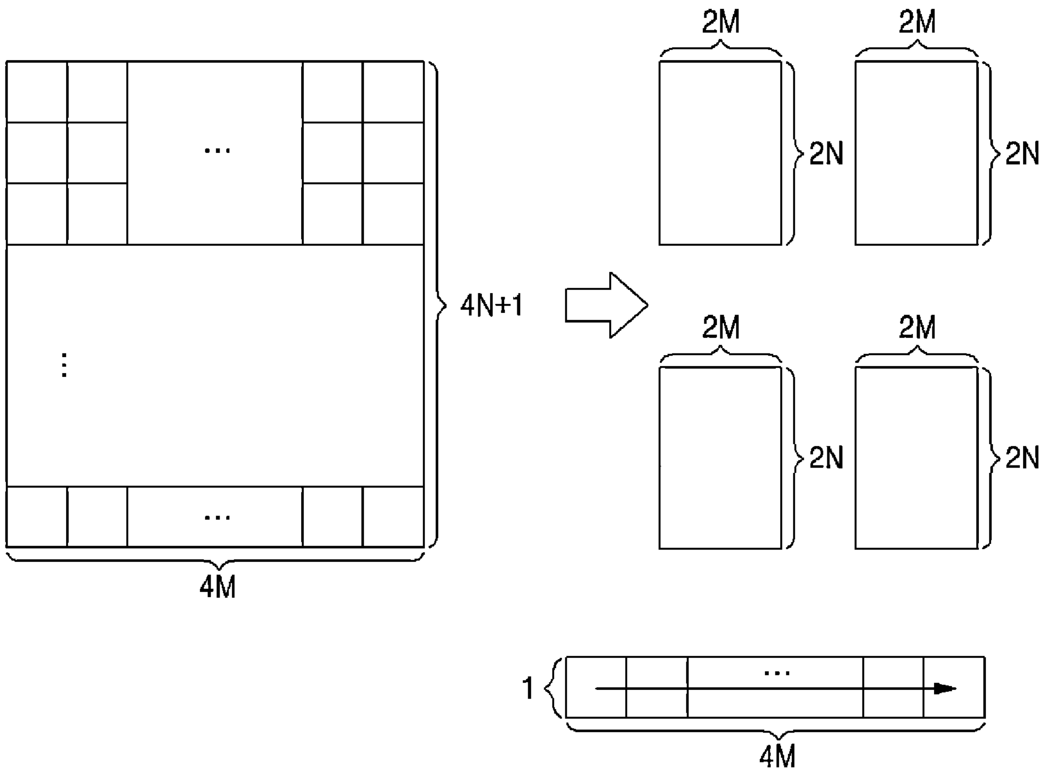
FIG. 20 is a diagram illustrating transform units according to another embodiment of the present disclosure.

In one example, if the height and/or width of each transform unit is non-multiple of two, the video decoding apparatus may further partition a portion that is non-multiple of two from the height and/or width of each transform unit, as shown in the example of FIG. 20, to generate a plurality of transform units with heights and widths that are a multiple of two and a region that is non-multiple of two. The region that is non-multiple of two may then be transformed into a transform unit of 1D form in the raster scan order.

As another example, if the height and/or width of each transform unit is not 2", the video decoding apparatus may further partition a portion that is not 2" from the height and/or width of each transform unit to generate a plurality of transform units with heights and widths of 2", and a region that is non-power of 2. The region that is non-power of 2 may then be transformed into a transform unit of 1D form in the raster scan order.

Figure 21:
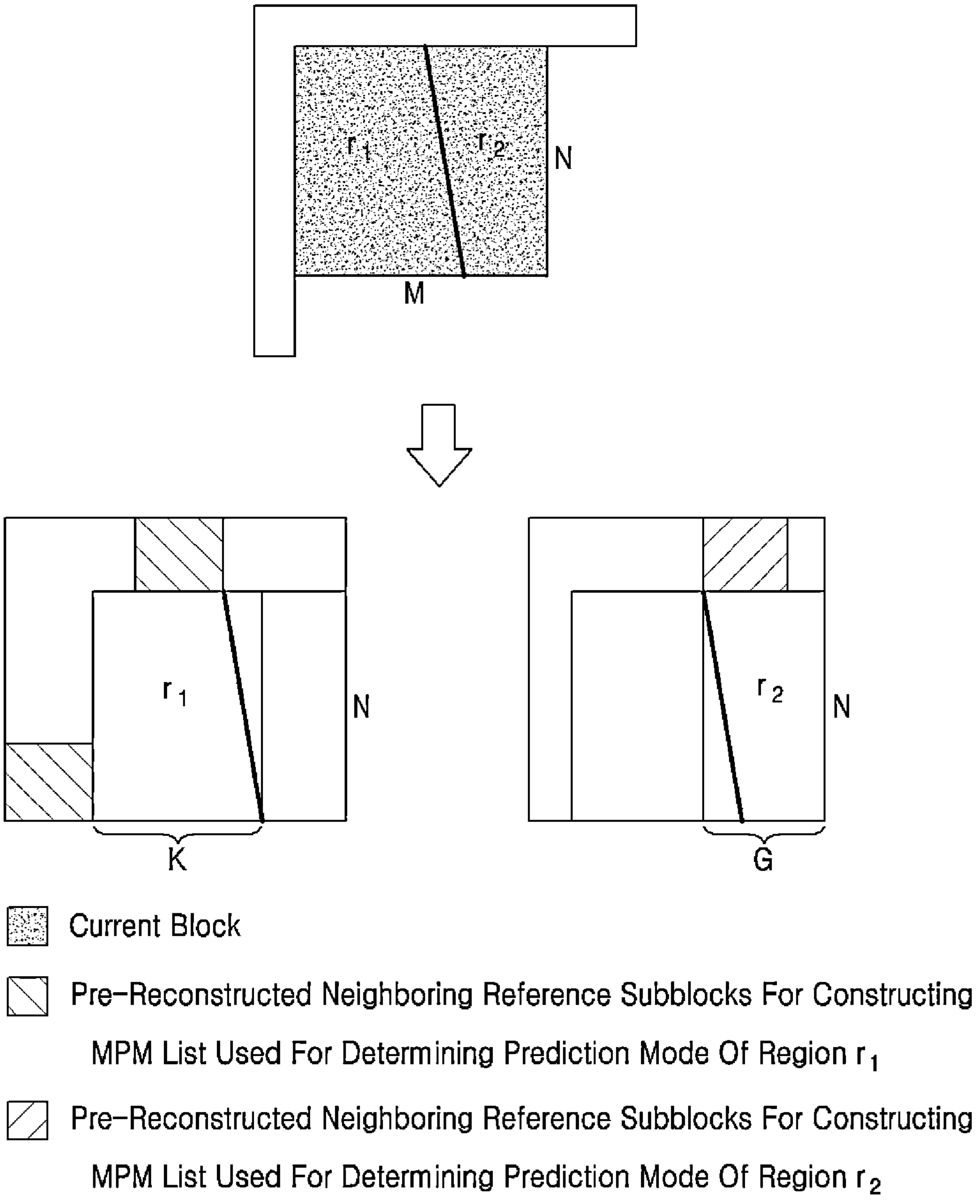
FIG. 21 is a diagram illustrating the determination of a prediction mode according to at least one embodiment of the present disclosure.

FIG. 21 is a diagram illustrating the determination of a prediction mode according to at least one embodiment of the present disclosure.

In one example, when the current block is partitioned into a plurality of sub-regions based on the derived arbitrary partitioning information, as in the example of FIG. 21, the prediction-mode determiner 606 may use a most probable mode (MPM) list to determine the prediction mode of each sub-region. The MPM list may be constructed using the prediction modes (having been utilized in the prediction process) of the previously reconstructed neighboring reference blocks of the sub-regions.

Meanwhile, the MPM technique utilizes the intra prediction modes of neighboring blocks for intra prediction of the current block. The video encoding apparatus can improve the coding efficiency of the intra prediction modes by transmitting the index of the MPM list in place of the index of the prediction mode.

Figure 22A:
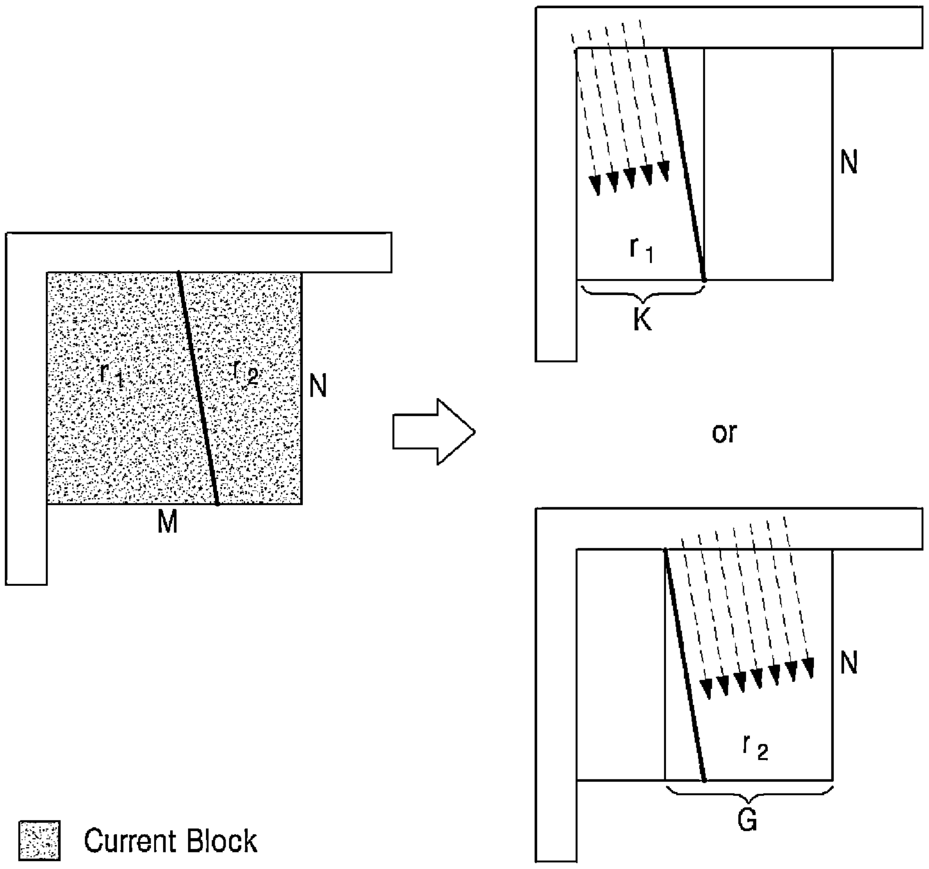
FIGS. 22A to 22C are diagrams illustrating the determination of prediction modes according to another embodiment of the present disclosure.
Figure 22B:
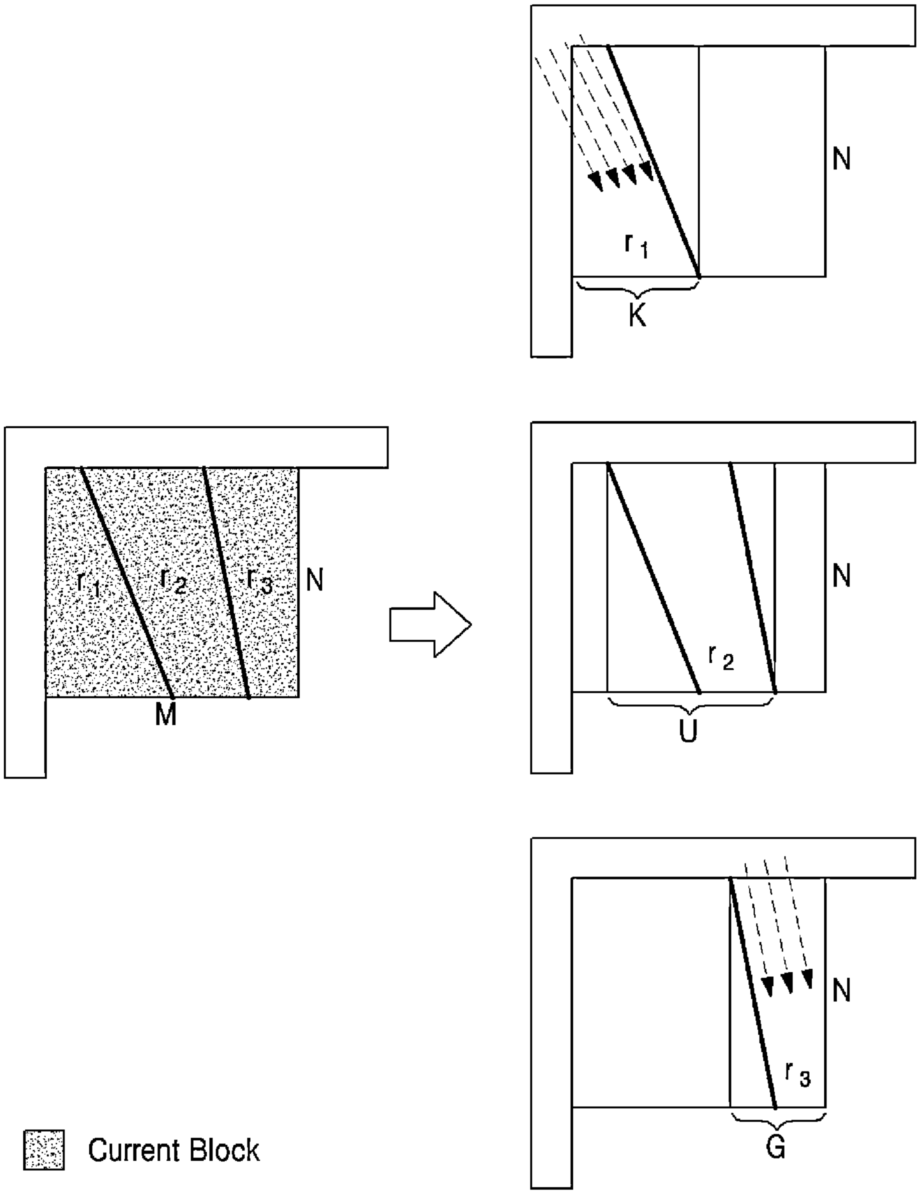
Figure 22C:
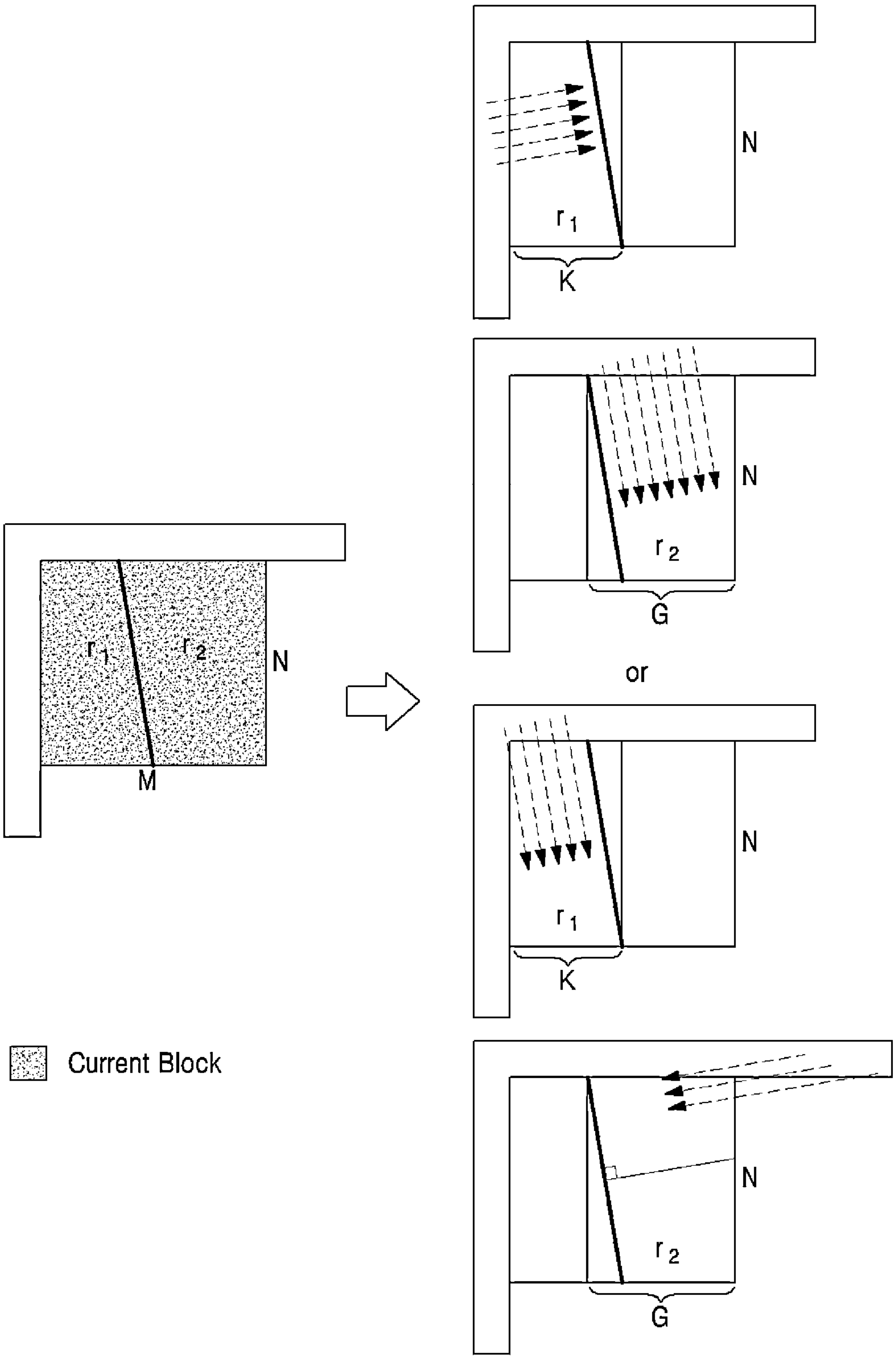

FIGS. 22A through 22C are diagrams illustrating the determination of prediction modes according to another embodiment of the present disclosure.

In one example, when the current block is partitioned into a plurality of sub-regions based on the derived arbitrary partitioning information, the prediction-mode determiner 606 may determine the prediction mode of each of some sub-regions as follows. As in the example of FIGS. 22A and 22B, the prediction mode with the directionality having been used for the partitioning of the sub-region may be utilized as the prediction mode of that sub-region. In particular, where multiple sub-regions are partitioned as shown in the example of FIG. 22B, with respect to the outlying sub-regions, the prediction mode with the directionality having been used for the partitioning of the sub-region may be utilized as the prediction mode of that sub-region. In this case, to indicate whether to use the prediction mode with the same directionality as the directionality having been used for the partitioning of the relevant sub-region, a 1-bit flag may be signaled as prediction mode information from the video encoding apparatus to the video decoding apparatus.

Further, as in the example of FIG. 22C, where the current block is partitioned into two sub-regions based on the derived arbitrary partitioning information, the prediction-mode determiner 606 may determine the prediction mode as follows. With respect to one sub-region, the prediction-mode determiner 606 may determine to use a prediction mode with the directionality having been used for the partitioning of that sub-region, and with respect to the other sub-region, may determine to use a prediction mode with a directionality perpendicular to the directionality having been used for the partitioning of that sub-region. In this case, the prediction mode information of one sub-region may be signaled using a 1-bit flag as described above, and the prediction mode information of the other sub-region may be implicitly derived.

As another example, when the current block is partitioned into a plurality of sub-regions based on the derived arbitrary partitioning information, the prediction-mode determiner 606 may determine the prediction mode of the sub-region having the largest or smallest area among the sub-regions as follows. The prediction-mode determiner 606 may determine a prediction mode with the directionality having been used for the partitioning of that sub-region or a prediction mode having a directionality perpendicular to the directionality having been used for the partitioning of that sub-region.

Furthermore, if the current block is partitioned into two sub-regions based on the derived arbitrary partitioning information, the prediction-mode determiner 606 may determine the prediction mode as follows. With respect to one sub-region, the prediction-mode determining unit 606 may determine to use a prediction mode with the directionality having been used for the partitioning of that sub-region or a prediction mode having a directionality perpendicular to the directionality having been used, and with respect to the other sub-region, may determine to use a planar or DC mode.

Figure 23:
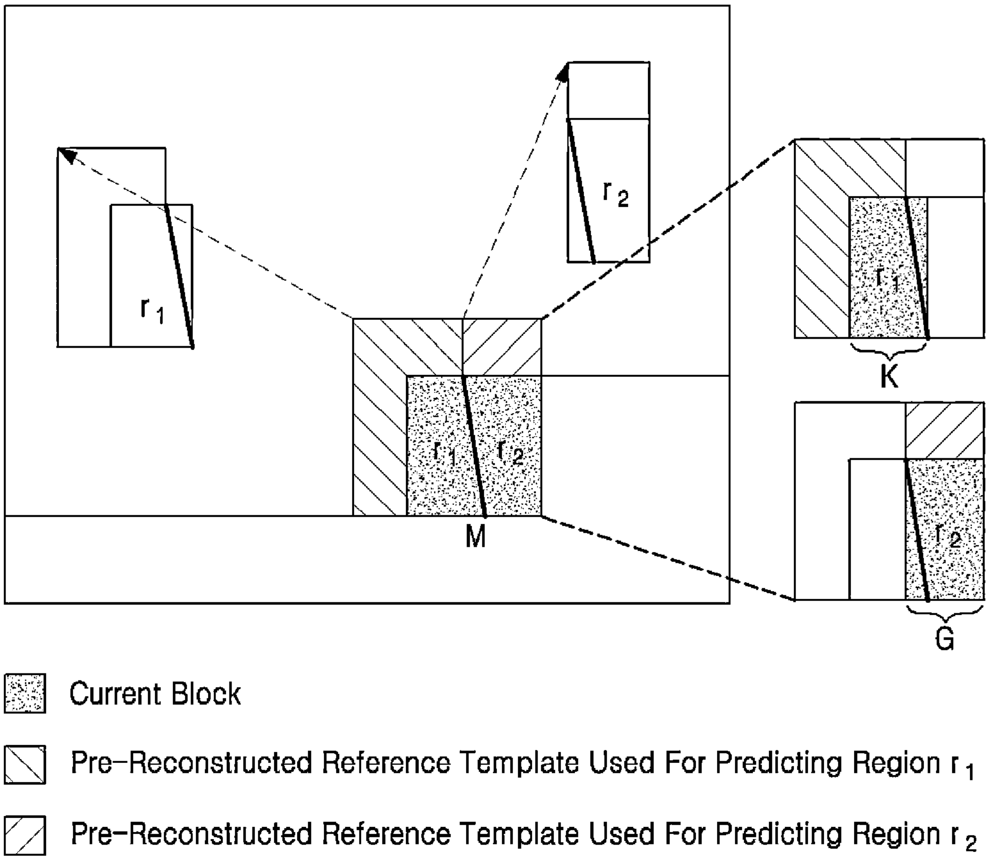
FIG. 23 is a diagram illustrating the generation of predicted signals based on template matching, according to at least one embodiment of the present disclosure.

FIG. 23 is a diagram illustrating the generation of predicted signals based on template matching, according to at least one embodiment of the present disclosure.

In one example, when the current block is partitioned into a plurality of sub-regions based on the derived arbitrary partitioning information, the prediction-mode determiner 606 may utilize template matching based on a previously reconstructed neighboring reference template of each sub-region, as shown in the example of FIG. 23. Then, the prediction performer 608 may generate the predicted signals of each sub-region by using the reference region selected according to the template matching.

In one example, when the current block is partitioned into a plurality of sub-regions based on the derived arbitrary partitioning information, the prediction performer 608 may generate the predicted signals of each sub-region by using template matching and/or a parsed prediction mode. If the parsed prediction mode is utilized, the previously reconstructed neighboring reference samples of the relevant sub-region may be utilized to generate the predicted signals.

Figure 24A:
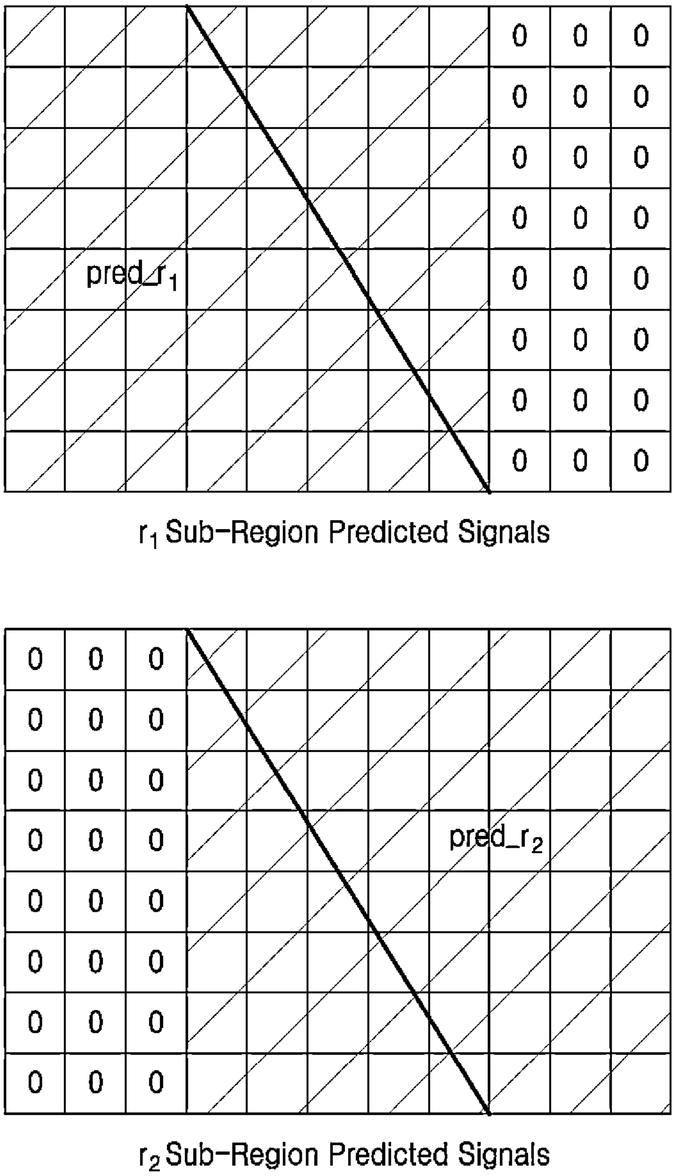
FIGS. 24A and 24B are diagrams illustrating a weighted sum of predicted signals in sub-regions, according to at least one embodiment of the present disclosure.
Figure 24B:
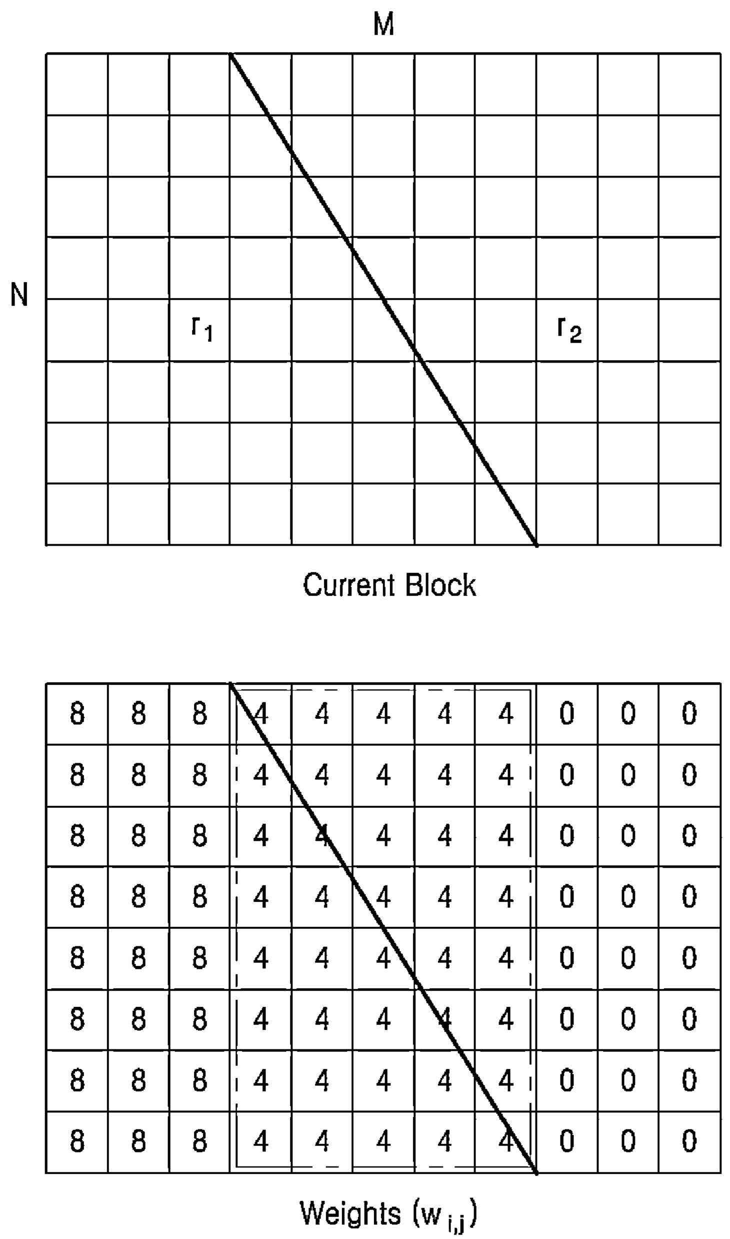

FIGS. 24A and 24B are diagrams illustrating a weighted sum of predicted signals in sub-regions, according to at least one embodiment of the present disclosure.

The weighted summer 706 according to this embodiment weight sums the portions shared by the predicted signals pred_r1 and pred_r2 of the respective sub-regions based on the partitioning boundary of the sub-regions, as shown in the examples of FIGS. 24A and 24B. To this end, the weighted summation unit 706 may derive the weights $w_{ij}$ and use the derived weights to generate the final predicted signals pred_cur, as shown in Equation 3.

$$\text{pred\_cur}(i,j) = (w_{i,j} \times \text{pred\_r}_1(i,j) + (8 - w_{i,j}) \times \text{pred\_r}_2(i,j)) \gg 3 \quad \text{[Equation 3]}$$

Figure 25A:
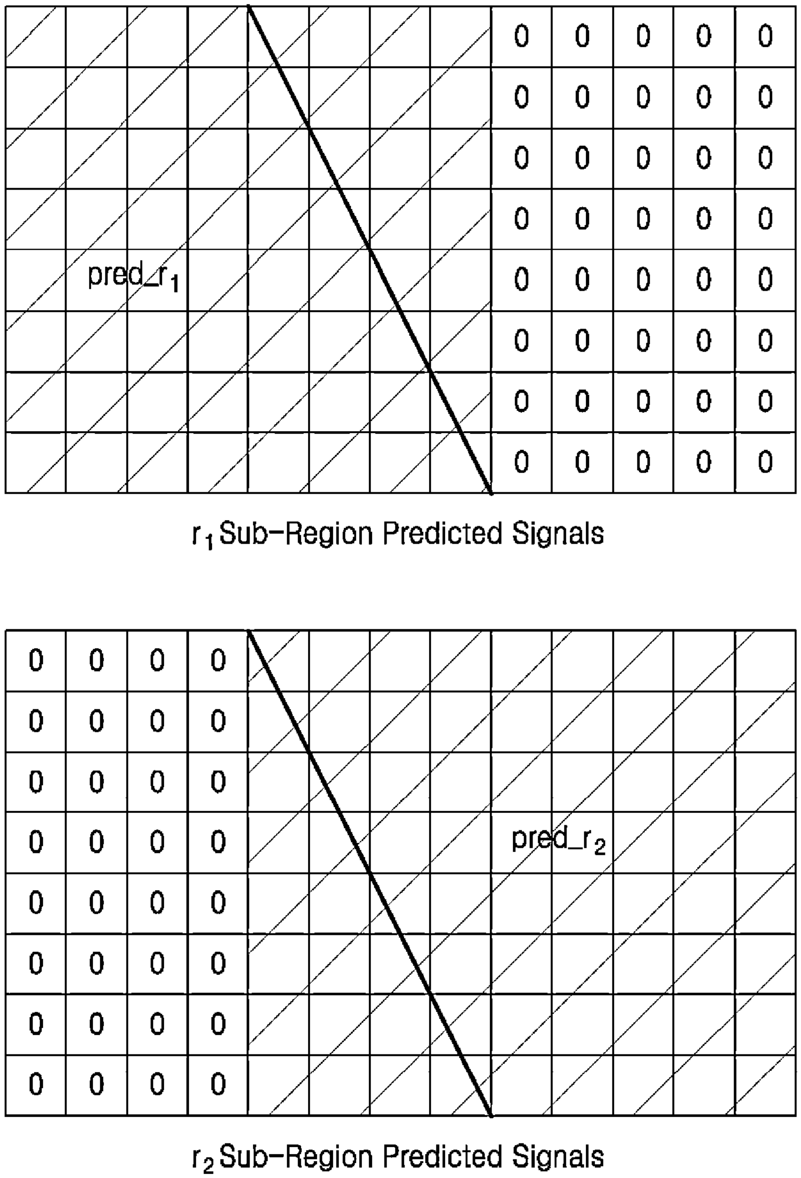
FIGS. 25A and 25B are diagrams illustrating a weighted sum of predicted signals in sub-regions, according to another embodiment of the present disclosure.
Figure 25B:
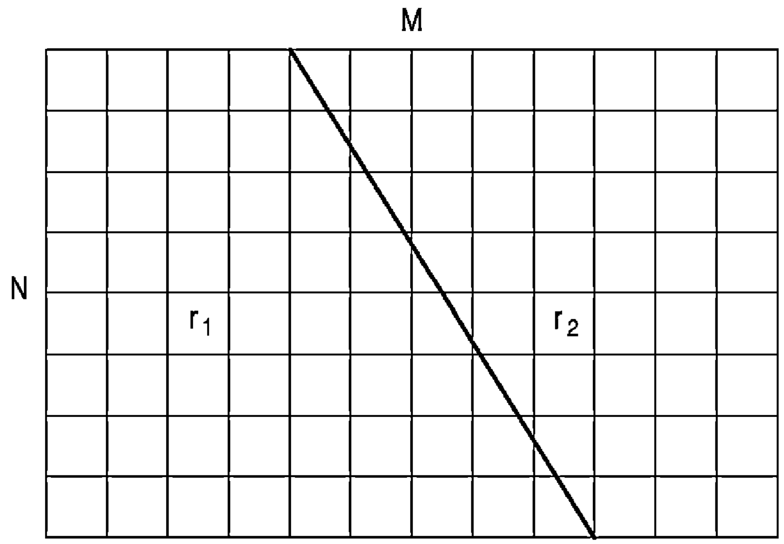
Figure 25B:
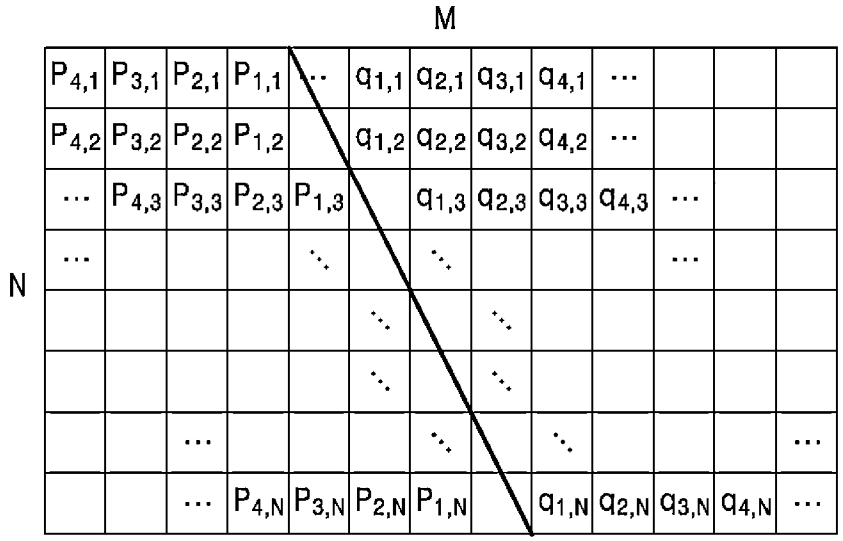

FIGS. 25A and 25B are diagrams illustrating a weighted sum of predicted signals in sub-regions, according to another embodiment of the present disclosure.

In one example, the weighted summer 706 may implicitly derive the weights by using the change in luminance values of the predicted signals in each sub-region relative to the partitioning boundary of the sub-regions. The derived weights may then be used to generate the final predicted signals of the current block.

In the example of FIGS. 25A and 25B, when the current block of size M×N is partitioned into two sub-regions $r_1$ and $r_2$, the weighted summer 706 for the predicted signals pred_$r_1$ and pred_$r_2$ of each region, may derive the amounts of change in luminance values (h_$R_1$(j) and h_$r_2$(j)) of the predicted signals of the respective sub-regions relative to the partitioning boundary, as shown in Equation 4.

$$\text{h\_r}_1(j) = \text{pred\_r}_1(p_{1,j}) + \text{pred\_r}_1(p_{3,j}) - 2 \times \text{pred\_r}_1(p_{2,j}) \quad \text{[Equation 4]}$$
$$\text{h\_r}_2(j) = \text{pred\_r}_2(q_{1,j}) + \text{pred\_r}_2(q_{3,j}) - 2 \times \text{pred\_r}_2(q_{2,j})$$

Here, $p_{ij}$ and $q_{ij}$ represent the luminance values of the pixels in the current block relative to the partitioning boundary, as illustrated in FIG. 25B.

In one example, the weighted summer 706 may derive means (H_$r_1$ and H_$r_2$) of the amount of change in luminance values (h_$r_1$(j) and h_$r_2$(j)) of the predicted signals of the respective sub-regions, as shown in Equation 5.

$$\text{H\_r}_1 = \frac{1}{N}\sum_{j=1}^{N} \text{h\_r}_1(j) \quad \text{[Equation 5]}$$
$$\text{H\_r}_2 = \frac{1}{N}\sum_{j=1}^{N} \text{h\_r}_2(j)$$

The weighted summer 706 may derive the weights $w_{ij}$ by applying thresholds ($T_{BH}$ and $T_{BL}$, where $T_{BL}<T_{BH}$) to the sum of means H_$r_1$ and H_$r_2$, as shown in the example of FIG. 26.

As another example, the weighted summer 706 may derive partial means (H_$r_1$(x,K) and H_$r_2$(x,K) of the amounts of change in luminance values (h_$r_1$(j) and h_$r_2$(j)) of the predicted signals of the respective sub-regions, as shown in Equation 6.

$$\text{H\_r}_1(x,K) = \frac{1}{K-x+1}\sum_{j=x}^{K} h_{r_1}(j) \quad \text{[Equation 6]}$$
$$\text{H\_r}_2(x,K) = \frac{1}{K-x+1}\sum_{j=x}^{K} \text{h\_r}_2(j)$$

Here, K<N, and x∈{1, . . . , N−1}.

Figure 27:
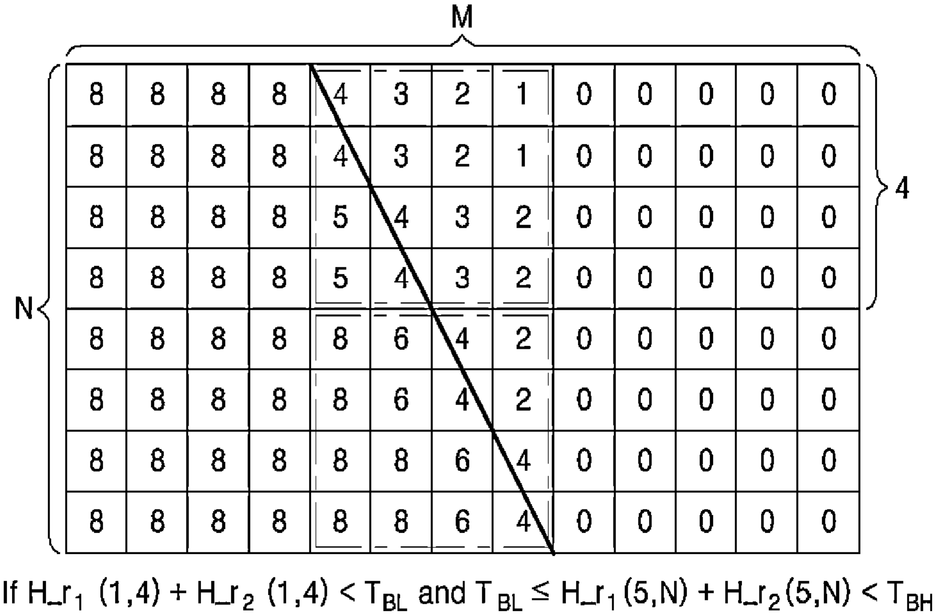

The weighted summer 706 may derive the weights $w_{ij}$ by applying the thresholds ($T_{BH}$ and $T_{BL}$, where $T_{BL}<T_{BH}$) to the sum of partial means H_$r_1$(x,K) and H_$r_2$(x,K), as shown in the example of FIG. 27.

The thresholds $T_{BH}$ and $T_{BL}$ may be signaled by the video encoding apparatus to the video decoding apparatus. Alternatively, the thresholds may be determined from a table predefined between the video encoding apparatus and the video decoding apparatus based on the quantization parameters.

Figure 28A:
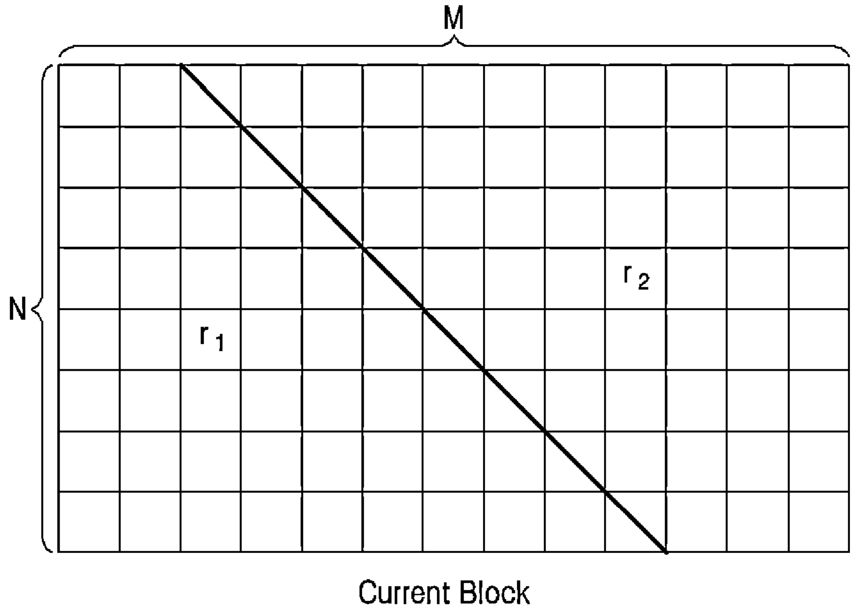
FIGS. 28A to 28C are diagrams illustrating weighted sums of predicted signals in sub-regions, according to yet other embodiments of the present disclosure.
Figure 28B:
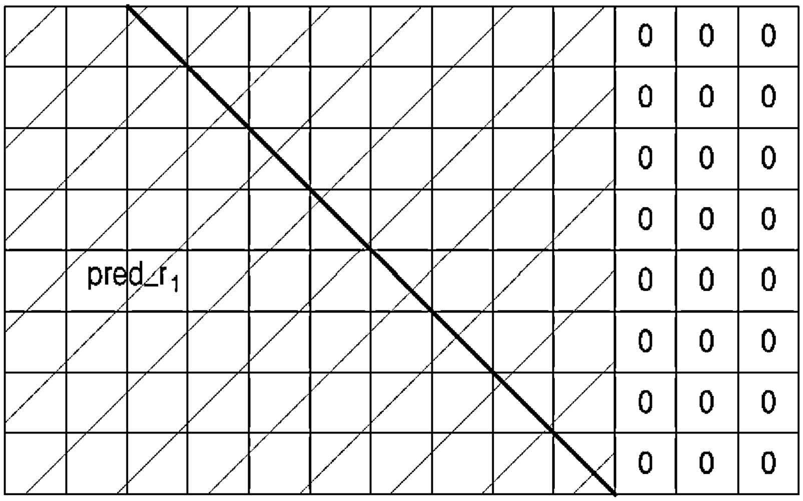
Figure 28B:
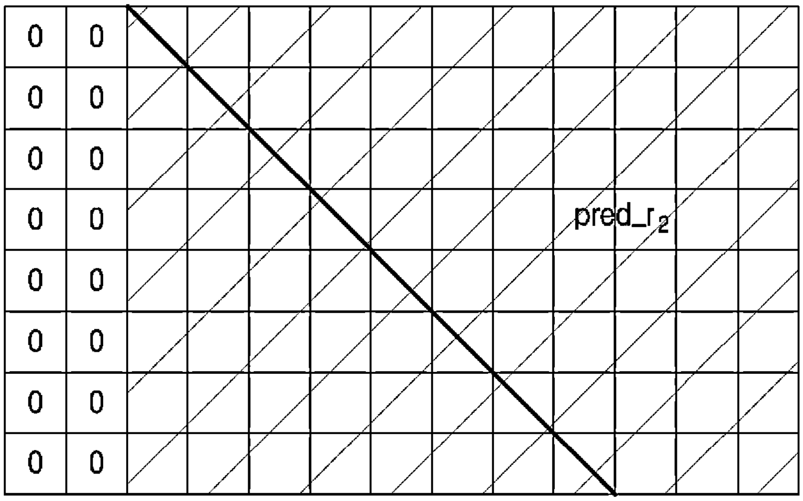
Figure 28C:
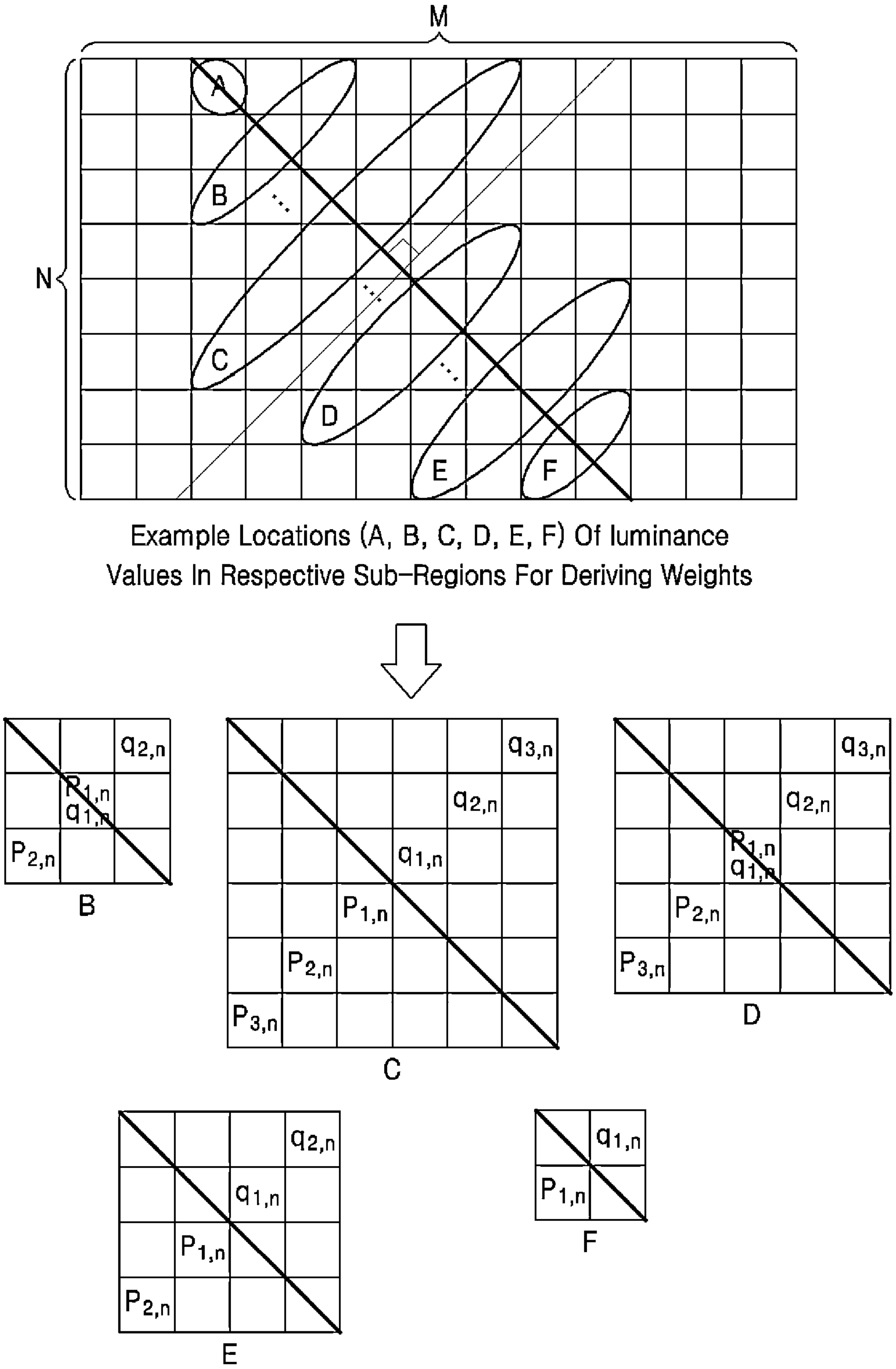

FIGS. 28A through 28C are diagrams illustrating weighted sums of predicted signals in sub-regions, according to yet other embodiments of the present disclosure.

As another example, when the current block of size M×N is partitioned into two sub-regions $r_1$ and $r_2$, as shown in the examples of FIGS. 28A and 28B, the weighted summer 706 with respect to the predicted signals pred_$r_1$ and pred_$r_2$ in each region, may derive the amounts of change in luminance values of the predicted signals that are present in a direction perpendicular to the partitioning boundary, as shown in the example of FIG. 28C.

For example, at locations C and D illustrated in FIG. 28C, the amounts of change in luminance values, h_$r_1$(j) and h_$r_2$(j) may be derived using Equation 4. Additionally, at locations B and E illustrated in FIG. 28C, the amounts of change in luminancevalues, h_$r_1$(j) and h_$r_2$(j) may be derived using Equation 7.

$$\text{h\_r}_1(j) = |\text{pred\_r}_1(p_{1,j}) - \text{pred\_r}_1(p_{2,j})| \quad \text{[Equation 7]}$$
$$\text{h\_r}_2(j) = |\text{pred\_r}_2(q_{1,j}) - \text{pred\_r}_2(q_{2,j})|$$

Further, at location F illustrated in FIG. 28C, the amounts of change in luminance values, h_$r_1$(j) and h_$r_2$(j) may be derived using Equation 8.

$$\text{h\_r}_1(j) = |\text{pred\_r}_1(p_{1,j})| \quad \text{[Equation 8]}$$
$$\text{h\_r}_2(j) = |\text{pred\_r}_2(q_{1,j})|$$

Furthermore, if a pixel is adjacent to the interface of the current block, such as at location A illustrated in FIG. 28C, the weight of that pixel may be implicitly determined as a middle value of the entire weight range, without a separate derivation process.

The weighted summer 706 may derive the amounts of change in luminance values, $h\_r_1(j)$ and $h\_r_2(j)$ for each sub-region, and then derive the weights of the current block to be distributed in a direction perpendicular to the directionality of the arbitrary partitioning information of the current block, similar to the examples in FIG. 26 or FIG. 27, using Equation 5 or Equation 6. The weighted summer 706 may utilize the derived weights to generate the final predicted signals of the current block, as shown in Equation 3.

Figure 29:
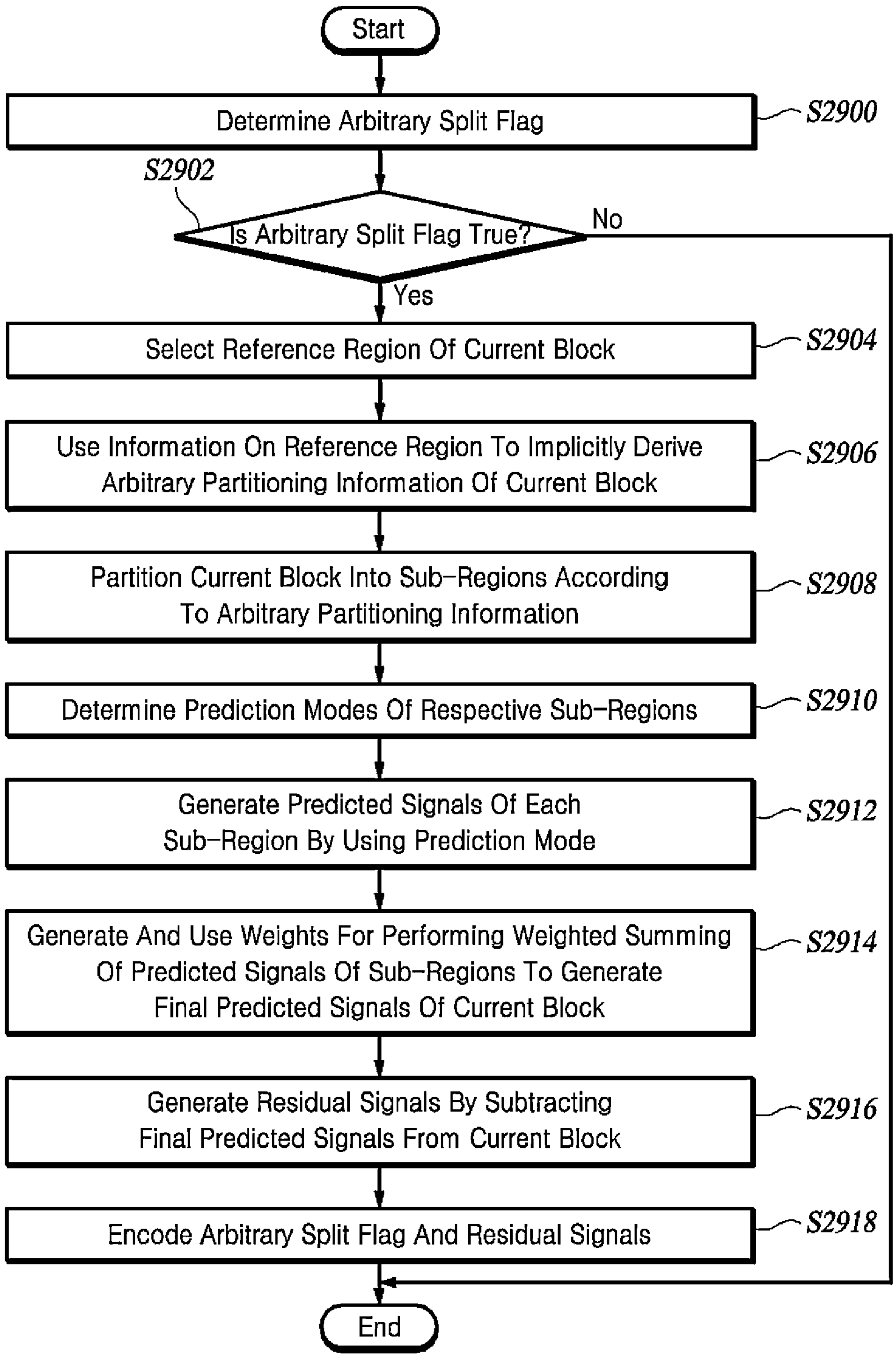
FIG. 29 is a flowchart of a video encoding method utilizing arbitrary partitioning, according to at least one embodiment of the present disclosure.
Figure 30:
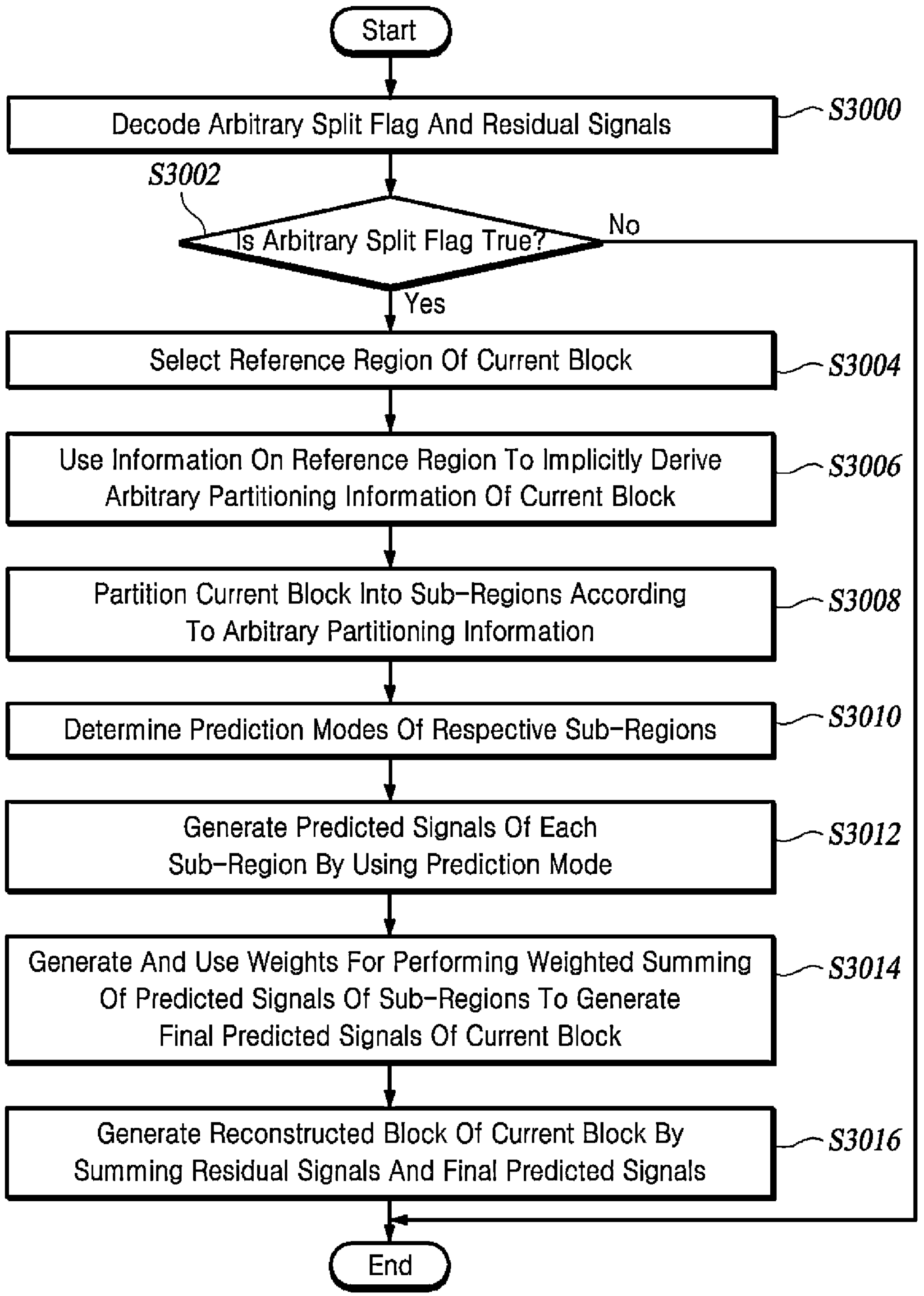
FIG. 30 is a flowchart of a video decoding method utilizing arbitrary partitioning, according to at least one embodiment of the present disclosure.

Referring now to FIGS. 29 and 30, a video encoding method and a video decoding method utilizing arbitrary partitioning according to the present embodiment are described.

FIG. 29 is a flowchart of a video encoding method utilizing arbitrary partitioning, according to at least one embodiment of the present disclosure.

The video encoding apparatus determines an arbitrary split flag (S2900). Here, the arbitrary split flag indicates whether to arbitrarily partition the current block.

The video encoding apparatus checks for the arbitrary split flag (S2902).

If the arbitrary split flag is true (Yes in S2902), the video encoding apparatus performs the following steps. Accordingly, if the arbitrary split flag is false (No in S2902), the following steps are omitted.

The video encoding apparatus selects a reference region of the current block (S2904). The reference region is a previously reconstructed region present at the top and/or left side of the current block.

The video encoding apparatus uses information on the reference region to implicitly derive the arbitrary partitioning information of the current block (S2906).

The video encoding apparatus selects non-overlapping reference subblocks of a preset size with respect to the reference region.

The video encoding apparatus calculates the mean and variance of the pixel values included in each of the reference subblocks.

The video encoding apparatus may be responsive to the presence of multiple adjacent reference subblock pairs having a disparity between their means greater than a preset mean threshold, for deriving the arbitrary partitioning information based on boundares within those adjacent reference subblock pairs. Further, the video encoding apparatus may derive the arbitrary partitioning information such that the area of each sub-region is not smaller than the predefined area threshold, but may derive the arbitrary partitioning information based on, among the boundaries having a greater disparity between the means than the preset mean threshold, the interfaces having an even greater disparity between the means.

As another example, the video encoding apparatus may derive arbitrary partitioning information by utilizing the directionality within relevant reference subblocks of the reference subblocks having a greater variance than a preset variance threshold. Further, the video encoding apparatus may derive the arbitrary partitioning information such that the area of each sub-region is not smaller than the predefined area threshold, but may derive the arbitrary partitioning information based on the directionality of, among the reference subblocks having a greater variance than the preset variance threshold, the reference subblocks having an even greater variance.

As yet another example, the video encoding apparatus may derive the arbitrary partitioning information by utilizing the directionality within relevant reference subblock for the reference subblock having the largest variance.

Meanwhile, if the reference subblock having the largest variance is located at the top of the current block and has a horizontal directionality, or if the reference subblock having the largest variance is located to the left of the current block and has a vertical directionality, the video encoding apparatus may reflect the directionality as follows. The video encoding apparatus may derive the arbitrary partitioning information of the current block by utilizing the directionality information in, among the reference subblocks excluding the reference subblock having the largest variance, the reference subblock having the then largest variance (i.e., the second largest variance).

The directionality of the reference subblocks may be derived by such methods as the Hough transform, segmentation, and the like. After determining the method of deriving the directionality, the video encoding apparatus may signal the method to the video decoding apparatus.

As another example, the video encoding apparatus may derive directionality information based on whether deblocking filtering is to be performed during in-loop filtering of the reference subblocks, and then may use the directionality information to derive the arbitrary partitioning information.

The video encoding apparatus partitions the current block into sub-regions according to the arbitrary partitioning information (S2908).

The video encoding apparatus determines the prediction modes of the respective sub-regions (S2910).

The video encoding apparatus may use an MPM list to determine the prediction modes of the respective sub-regions. Here, the MPM list may be constructed by using the prediction modes of previously reconstructed reference subblocks neighboring the sub-regions.

As another example, in terms of optimizing coding efficiency, the video encoding apparatus determines a 1-bit flag as the prediction mode information. Here, the 1-bit flag indicates whether to use a prediction mode that has the same directionality as the directionality having been used for partitioning the sub-regions. When the 1-bit flag is true, the video encoding apparatus may determine, for some of the sub-regions, the prediction mode having the directionality as used for the partitioning of each sub-region as the prediction mode for each relevant sub-region.

As another example, if the current block is partitioned into two sub-regions based on the derived arbitrary partitioning information, the video encoding apparatus may determine the prediction mode as follows. With respect to one sub-region, the prediction mode may be used, which has the directionality having been used for the partitioning of that sub-region, and with respect to the other sub-region, the prediction mode may be used, which has the directionality perpendicular to the directionality having been used for the partitioning of that sub-region.

The video encoding apparatus uses the prediction mode to generate predicted signals for each sub-region (S2912).

The video encoding apparatus generates weights, and by using the weights, performs weighted summing of the predicted signals of the sub-regions to generate the final predicted signals of the current block (S2914).

The video encoding apparatus may implicitly derive the weights by using the amount of change in the luminance values of the predicted signals of each sub-region relative to the partitioning boundary of the sub-regions. Alternatively, the video encoding apparatus may implicitly derive the weights by utilizing the amounts of change in the luminance values of the predicted signals that are present in a direction perpendicular to the partitioning boundary of the sub-regions.

The video encoding apparatus generates the residual signals by subtracting the final predicted signals from the current block (S2916).

The video encoding apparatus encodes the arbitrary split flag and the residual signals (S2918). The video encoding apparatus encodes the arbitrary split flag and residual signals to generate a bitstream which can then be transmitted to the video decoding apparatus.

FIG. 30 is a flowchart of a video decoding method utilizing arbitrary partitioning, according to at least one embodiment of the present disclosure.

The video decoding apparatus decodes an arbitrary split flag and residual signals from the bitstream (S3000). Here, the arbitrary split flag indicates whether to arbitrarily partition the current block.

The video decoding apparatus checks for the arbitrary split flag (S3002).

The video decoding apparatus performs the following steps if the arbitrary split flag is true (Yes in S3002). Accordingly, if the arbitrary split flag is false (No in S3002), the following steps are omitted.

The video decoding apparatus selects a reference region of the current block (S3004). The reference region is a previously reconstructed region present at the top and/or left side of the current block.

The video decoding apparatus uses the information on the reference region to implicitly derive the arbitrary partitioning information of the current block (S3006).

The video decoding apparatus partitions the current block into sub-regions according to the arbitrary partitioning information (S3008).

The video decoding apparatus determines the prediction mode for each sub-region (S3010).

The video decoding apparatus uses the MPM list to determine the prediction modes of the respective sub-regions. Here, the MPM list may be constructed by using the prediction modes of previously reconstructed reference sub-blocks neighboring the sub-regions.

As another example, a video decoding apparatus decodes, from a bitstream, a 1-bit flag as the prediction mode information. Here, the 1-bit flag indicates whether to use a prediction mode with the same directionality as the directionality used to partition the sub-regions. When the 1-bit flag is true, the video decoding apparatus may determine, for some sub-regions, the prediction mode with the directionality used for partitioning each sub-region as the prediction mode for each relevant sub-region.

The video decoding apparatus uses the prediction mode to generate predicted signals for each sub-region (S3012).

The video decoding apparatus generates weights, and by using the weights, performs weighted summing of the predicted signals of the sub-regions to generate the final predicted signals of the current block (S3014).

The video decoding apparatus generates a reconstructed block of the current block by adding the residual signals and the final predicted signals (S3016).

Although the steps in the respective flowcharts are described to be sequentially performed, the steps merely instantiate the technical idea of some embodiments of the present disclosure. Therefore, a person having ordinary skill in the art to which this disclosure pertains could perform the steps by changing the sequences described in the respective drawings or by performing two or more of the steps in parallel. Hence, the steps in the respective flowcharts are not limited to the illustrated chronological sequences.

It should be understood that the above description presents illustrative embodiments that may be implemented in various other manners. The functions described in some embodiments may be realized by hardware, software, firmware, and/or their combination. It should also be understood that the functional components described in the present disclosure are labeled by " . . . unit" to strongly emphasize the possibility of their independent realization.

Meanwhile, various methods or functions described in some embodiments may be implemented as instructions stored in a non-transitory recording medium that can be read and executed by one or more processors. The non-transitory recording medium may include, for example, various types of recording devices in which data is stored in a form readable by a computer system. For example, the non-transitory recording medium may include storage media, such as erasable programmable read-only memory (EPROM), flash drive, optical drive, magnetic hard drive, and solid state drive (SSD) among others.

Although embodiments of the present disclosure have been described for illustrative purposes, those having ordinary skill in the art to which this disclosure pertains should appreciate that various modifications, additions, and substitutions are possible, without departing from the idea and scope of the present disclosure. Therefore, embodiments of the present disclosure have been described for the sake of brevity and clarity. The scope of the technical idea of the embodiments of the present disclosure is not limited by the illustrations. Accordingly, those having ordinary skill in the art to which the present disclosure pertains should understand that the scope of the present disclosure should not be limited by the above explicitly described embodiments but by the claims and equivalents thereof.

What is claimed is:

1. A method performed by a video decoding apparatus for intra-predicting a current block, the method comprising:

selecting a reference region of the current block, the reference region being a previously reconstructed region that is present in at least one of a top or a left of the current block;

deriving arbitrary partitioning information of the current block implicitly by using directionality information derived from the reference region;

partitioning the current block into sub-regions according to the arbitrary partitioning information;

determining a prediction mode for each sub-region of the sub-regions;

generating predicted signals of each sub-region by using the prediction mode; and generating and using weights to perform weighted summing on the predicted signals of the sub-regions to generate final predicted signals of the current block.

2. The method of claim 1, wherein deriving the arbitrary partitioning information comprises:

dividing the reference region into reference subblocks that are non-overlapping and have a predetermined size.

3. The method of claim 2, wherein deriving the arbitrary partitioning information further comprises:

calculating a pixel value mean of pixel values included in each reference subblock for each of the reference subblocks;

at the top of the current block, selecting at least one pair of adjacent reference subblocks with a greater disparity between pixel value means than a preset mean disparity threshold;

at the left of the current block, selecting at least one pair of adjacent reference subblocks with a greater disparity between pixel value means than the preset mean disparity threshold; and deriving the arbitrary partitioning information based on a straight line that connects a boundary between the pair of the adjacent reference subblocks selected at the top of the current block with a boundary between the pair of the adjacent reference subblocks selected at the left of the current block.

4. The method of claim 2, wherein deriving the arbitrary partitioning information further comprises:

calculating a variance of pixel values included in each reference subblock for each of the reference subblocks to select at least one reference subblock with a greater variance than a preset variance threshold; and deriving the arbitrary partitioning information by extending, over the current block, a straight line which represents a directionality within the selected reference subblocks.

5. The method of claim 2, wherein deriving the arbitrary partitioning information further comprises:

calculating a variance of pixel values included in each reference subblock for each of the reference subblocks to select a reference subblock that has a largest variance; and deriving the arbitrary partitioning information by extending, over the current block, a straight line which represents a directionality within the selected reference subblock.

6. The method of claim 5, wherein deriving the arbitrary partitioning information further comprises:

when the reference subblock with the largest variance exists at the top of the current block and has the directionality of a horizontal direction, or when the reference subblock with the largest variance exists on the left of the current block and has the directionality of a vertical direction, deriving the arbitrary partitioning information by extending, over the current block, a straight line which represents a directionality in a reference subblock that has a second largest variance.

7. The method of claim 2, wherein deriving the arbitrary partitioning information further comprises:

detecting a pair of adjacent reference subblocks where strong filtering is applied on a boundary between the adjacent reference subblocks during an in-loop filtering process; and then deriving the arbitrary partitioning information by extending, over the current block, a straight line which represents a directionality within a block of a predetermined size that partially overlaps the adjacent reference subblocks and includes the boundary between the adjacent reference subblocks.

8. The method of claim 2, wherein determining the prediction mode comprises:

utilizing a most probable mode (MPM) list for determining the prediction mode for each sub-region of the sub-regions, the MPM list being constructed by using prediction modes of previously reconstructed reference subblocks neighboring the sub-regions.

9. The method of claim 4, wherein determining the prediction mode comprises:

decoding, from a bitstream, a flag that indicates whether to use a prediction mode having a directionality that coincides with a directionality used to partition the sub-regions.

10. The method of claim 9, wherein determining the prediction mode further comprises:

when the flag is true, determining a prediction mode that has a directionality used for partitioning each sub-region of some sub-regions, as a prediction mode for each sub-region.

11. The method of claim 1, wherein weighted summing the predicted signals of the sub-regions comprises:

deriving the weights implicitly by using an amount of change in luminance values of predicted signals of each sub-region relative to a partitioning boundary which divides the current block into the sub-regions.

12. The method of claim 1, further comprising:

decoding, from a bitstream, an arbitrary split flag that indicates whether the current block is to be partitioned based on an arbitrary partitioning; and checking for the arbitrary split flag, wherein when the arbitrary split flag is true, selecting the reference region of the current block.

13. A method performed by a video encoding apparatus for intra-predicting a current block, the method comprising:

selecting a reference region of the current block, the reference region being a previously reconstructed region that is present in at least one of a top or a left of the current block;

deriving arbitrary partitioning information of the current block implicitly by using directionality information derived from the reference region;

partitioning the current block into sub-regions according to the arbitrary partitioning information;

determining a prediction mode for each sub-region of the sub-regions;

generating predicted signals of each sub-region by using the prediction mode; and generating and using weights to perform weighted summing on the predicted signals of the sub-regions to generate final predicted signals of the current block.

14. The method of claim 13, further comprising:

determining an arbitrary split flag that indicates whether the current block is to be partitioned based on an arbitrary partitioning; and checking for the arbitrary split flag, wherein when the arbitrary split flag is true, selecting the reference region of the current block.

15. The method of claim 14, further comprising:

encoding the arbitrary split flag.

16. A method for providing a video decoding apparatus with video data, the method comprising:

encoding the video data into a bitstream; and transmitting the bitstream to the video decoding device, wherein encoding the video data comprises:

selecting a reference region of a current block, the reference region being a previously reconstructed region that is present in at least one of a top or a left of the current block;

deriving arbitrary partitioning information of the current block implicitly by using directionality information derived from the reference region;

partitioning the current block into sub-regions according to the arbitrary partitioning information;

determining a prediction mode for each sub-region of the sub-regions;

generating predicted signals of each sub-region by using the prediction mode; and generating and using weights to perform weighted summing on the predicted signals of the sub-regions to generate final predicted signals of the current block.

* * * * *